(12) United States Patent
Zach et al.

(10) Patent No.: US 11,171,817 B1
(45) Date of Patent: Nov. 9, 2021

(54) MULTI-USER MULTIPLE-INPUT MULTIPLE-OUTPUT (MU-MIMO) PEAK-TO-AVERAGE-POWER RATIO (PAPR) REDUCTION

(71) Applicant: QUALCOMM INCORPORATED, San Diego, CA (US)

(72) Inventors: Noam Zach, Kiryat Ono (IL); Guy Wolf, Rosh Haayin (IL); Sharon Levy, Binyamina (IL); Ory Eger, Tel Aviv (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/849,944

(22) Filed: Apr. 15, 2020

(51) Int. Cl.
*H04L 27/26* (2006.01)
*H04B 7/06* (2006.01)
*H04B 7/0452* (2017.01)

(52) U.S. Cl.
CPC ....... *H04L 27/2623* (2013.01); *H04B 7/0452* (2013.01); *H04B 7/0617* (2013.01); *H04L 27/2614* (2013.01)

(58) Field of Classification Search
CPC ............ H04L 27/2614; H04L 27/2623; H04B 7/0452; H04B 7/0617
See application file for complete search history.

(56) References Cited

U.S. PATENT DOCUMENTS

| 9,819,526 B2* | 11/2017 | Baligh ................ H04L 27/2614 |
| 10,050,816 B2 | 8/2018 | Rajagopal et al. |
| 10,050,817 B2 | 8/2018 | Terry |
| 10,447,520 B1* | 10/2019 | Shattil ................ H04B 7/0456 |
| 10,505,774 B1 | 12/2019 | Shattil |
| 10,567,065 B2 | 2/2020 | Kundargi et al. |
| 2020/0052946 A1* | 2/2020 | Zou ..................... H04L 27/2623 |

OTHER PUBLICATIONS

Ivanov. A., et al., "Unused Beam Reservation for PAPR Reduction in Massive MIMO System", Skolkovo Institute of Science and Technology, Moscow, Russia, Jun. 2018, 5 Pages.
Xu K., et al., "Beamforming MISO-OFDM PAPR Reduction: A Space-User Perspective", 2007 IEEE International Conference on Acoustics, Speech and Signal Processing-ICASSP, Apr. 15-20, 2007, 19 Pages, (Published Year:2009).

* cited by examiner

*Primary Examiner* — Betsy Deppe
(74) *Attorney, Agent, or Firm* — QUALCOMM Incorporated

(57) ABSTRACT

Methods related to wireless communication systems and reducing peak-to-average-power ratio (PAPR) in MU-MIMO transmissions are provided. A base station (BS) generates a plurality of communication signals including data for a plurality of user equipment (UE) devices in a plurality of serving beam subspaces. The BS may also generate a peak-to-average-power ratio (PAPR) reduction signal for one or more of the plurality of communication signals. A first portion of the PAPR reduction signal is in a first serving beam subspace of the plurality of serving beam subspaces based on a first error vector magnitude (EVM) associated with a first UE of the plurality of UEs. A second portion of the PAPR reduction signal is in a non-serving beam subspace. The BS may also transmit, to the plurality of UEs, the plurality of communication signals and the PAPR reduction signal. Other features are also claimed and described.

30 Claims, 10 Drawing Sheets

MULTI-USER MULTIPLE-INPUT MULTIPLE-OUTPUT (MU-MIMO) PEAK-TO-AVERAGE-POWER RATIO (PAPR) REDUCTION

TECHNICAL FIELD

The technology described below relates generally to wireless communication systems, and more particularly to multi-user multiple-input multiple-output (MU-MIMO) communications. Certain embodiments can enable and provide techniques allowing communication devices (e.g., user equipment devices or base stations) to efficiently reduce peak-to-average-power ratio (PAPR) in MU-MIMO transmissions while controlling interferences in serving beam subspaces and non-serving beam subspaces.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. As use cases and diverse deployment scenarios continue to expand in wireless communication, modulation and/or coding technique improvements may also yield benefits.

The rapid growth in energy consumption of wireless communication networks has become a concern for network operators. Base stations (BSs) may account for a large portion of power consumed by a wireless communication network. The most power consuming components in a BS are power amplifiers (PAs). The power consumption may become more critical in fifth generation (5G) deployments, where BSs with large antenna arrays and massive multiple-input multiple output (MIMO) are deployed. The large antenna arrays or massive MIMO BSs may have a large number or massive number of PAs (e.g., 64, 256, 512, 1024 or more), and thus may further increase BS power consumption. This may impact power dissipation of 5G networks and operators' operational expenditure (OPEX) related to electricity bills and energy dissipation.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques enabling improved multi-user multi-input multi-output (MU-MIMO) communication performance. Such improvements may be brought about via disclosed aspects, embodiments, and techniques providing peak-to-average-power ratio (PAPR) reduction in MU-MIMO transmissions with controllable interference on serving beam subspaces and non-serving beam subspaces. For example, a base station (BS) may generate a plurality of communication signals carrying data for a plurality of UEs in a plurality of serving beam subspaces. The BS may generate a PAPR reduction signal and transmit the PAPR reduction signal at the same time as the plurality of communication signals to reduce the PAPR of the communication signals. The BS may project a portion of the PAPR reduction signal onto one or more serving beam subspaces based on the UEs' EVM budgets. The BS may also project another portion of the PAPR reduction signal onto a non-serving beam subspace (that is not part of the serving beam space). The UEs can also report information related to the EVM budgets to assist the BS in determining subspace projection for the PAPR reduction signal.

For example, in an aspect of the disclosure, a method of wireless communication performed by a base station (BS), includes generating a plurality of communication signals including data for a plurality of user equipments (UEs) in a plurality of serving beam subspaces. The BS may also generate a peak-to-average-power ratio (PAPR) reduction signal for one or more of the plurality of communication signals. A first portion of the PAPR reduction signal is in a first serving beam subspace of the plurality of serving beam subspaces based on a first error vector magnitude (EVM) associated with a first UE of the plurality of UEs. A second portion of the PAPR reduction signal is in a non-serving beam subspace. The BS may also transmit, to the plurality of UEs, the plurality of communication signals and the PAPR reduction signal.

In an additional aspect of the disclosure, a method of wireless communication performed by a user equipment (UE), includes receiving, from a base station (BS), a plurality of reference signals in a set of peak-to-average-power ratio (PAPR) reduction beam subspaces. The UE may also transmit, to the BS, a measurement report based on at least a first reference signal of the plurality of reference signals. The UE may also receive, from the BS, a communication signal based on the measurement report, the communication signal satisfying a target PAPR.

In an additional aspect of the disclosure, a base station (BS) includes a processor configured to generate a plurality of communication signals including data for a plurality of user equipments (UEs) in a plurality of serving beam subspaces. The processor is also configured to generate a peak-to-average-power ratio (PAPR) reduction signal for one or more of the plurality of communication signals. A first portion of the PAPR reduction signal is in a first serving beam subspace of the plurality of serving beam subspaces based on a first error vector magnitude (EVM) associated with a first UE of the plurality of UEs. A second portion of the PAPR reduction signal is in a non-serving beam subspace. The UE may also include a transceiver configured to transmit, to the plurality of UEs, the plurality of communication signals and the PAPR reduction signal.

In an additional aspect of the disclosure, a user equipment (UE) includes a transceiver configured to receive, from a base station (BS), a plurality of reference signals in a set of peak-to-average-power ratio (PAPR) reduction beam subspaces. The transceiver is also configured to transmit, to the BS, a measurement report based on at least a first reference signal of the plurality of reference signals. The transceiver is also configured to receive, from the BS, a communication signal based on the measurement report, the communication signal satisfying a target PAPR.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
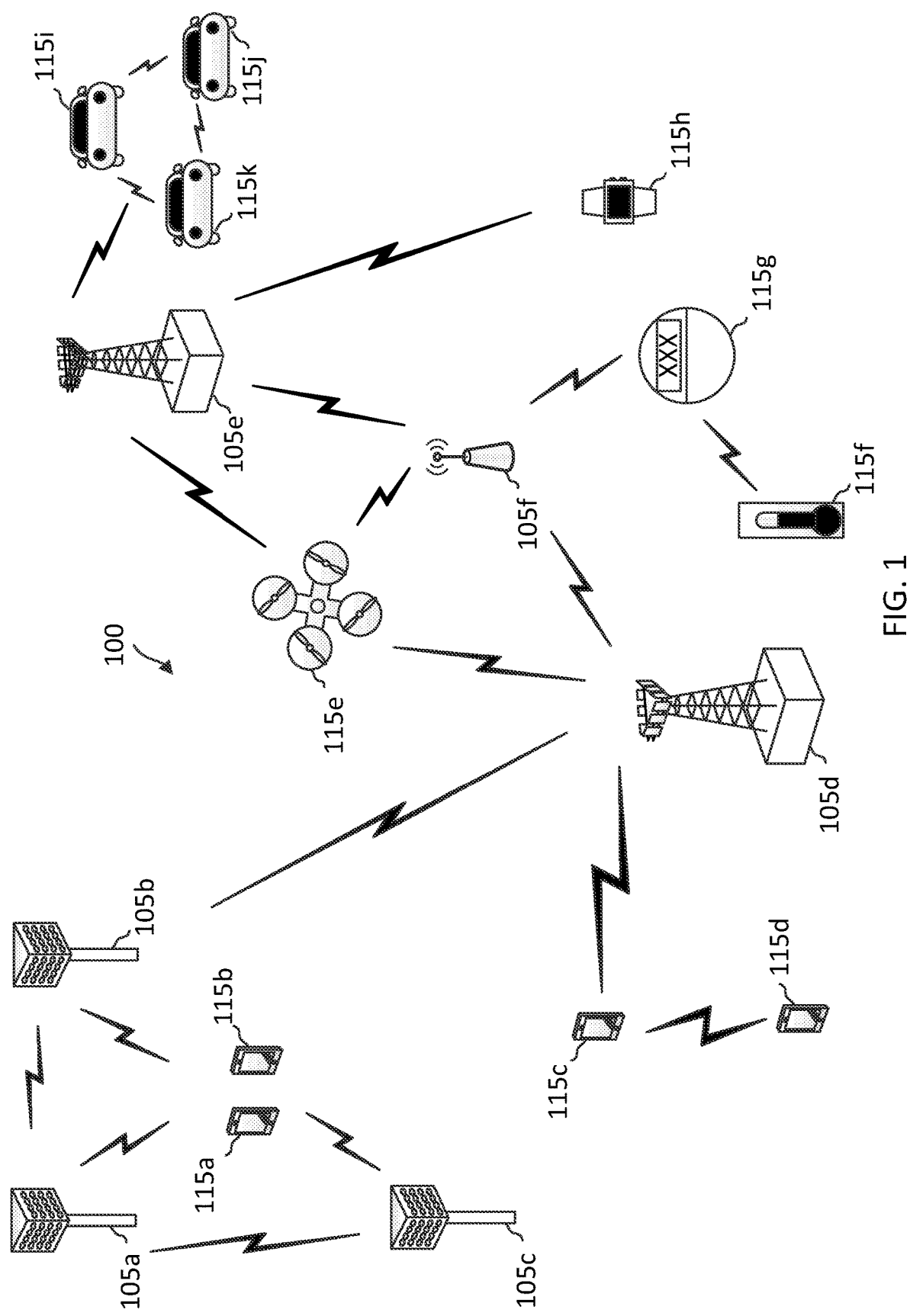
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP longterm evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., 1 ms), and users with wide ranges of mobility or lack thereof; and (3) with enhanced mobile broadband including extreme high capacity (e.g., 10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave)

transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

5G networks may likely consume more power than 4G or LTE networks due to the deployment of BSs supporting massive MIMO. Massive MIMO BSs may include a large number of power amplifiers (PAs) (e.g., about 64, 256, 128, 1024 or more). PAs may typically provide a linear performance at a lower input power, but may provide a higher power efficiency when operating at a higher input power in a non-linear region of the PA. A PA operating in a non-linear region can create distortions in the output signal. One approach to achieving linear performance at a PA is to reduce the input signal peak-to-average power ratio (PAPR). PAPR refers to a ratio between a peak power of a signal and an average power of the signal.

Orthogonal frequency-division multiplexing (OFDM) signals are widely used in 5G networks. However, OFDM signals are known to have a high PAPR. Various techniques have been proposed for PAPR reduction in OFDM signals. Some commonly used PAPR reduction techniques may include crest factor reduction (CFR), selective mapping (SLM)/partial transmit sequence (PTS), tone reservation (TR), and/or active constellation extension (ACE). The CFR technique includes hard-clipping followed by low-pass filtering. While the CFR technique may be simple to implement, it is signal-to-noise ratio (SNR) limited. Thus, the CFR technique may not be suitable for signals with high-order quadrature amplitude modulations (QAMs). The SLM/PTS technique applies randomization to a signal to achieve a reduced PAPR. While the SLM/PTS technique may not degrade a signal, the SLM/PTS technique may impact spatial precoding. The TR technique reserves a set of tones for PAPR reduction. The reservation of tones may increase system overhead and reduce system capacity and may additionally increase power consumption. The ACE technique may include dynamically moving signal points around original constellation points to reduce PAPR. The manipulation on the signal points can impact receiver performance.

In another approach, the high degree of freedoms provided by BSs with large antenna arrays is explored for PAPR reduction. For instance, signals additional to communication signals carrying useful information can be generated to reduce PAPR. To avoid degrading performance for target UEs, the PAPR reduction signals can be projected onto spatial subspaces or beam directions that are not used to serve target UEs. The spatial subspaces that are used to serve the target UEs may be referred to as serving beam spaces or UE beam spaces. The serving beam subspaces may correspond to spatial subspaces of serving beams or serving beam directions. The spatial subspaces that are not part of or orthogonal to the serving beam subspaces may be referred to as non-serving beam subspaces. While projecting PAPR reduction signals to non-serving beam subspaces may provide distortion-less PAPR reduction, it lacks controls for interference that may be imposed on the non-serving beam subspaces, and thus may impact inter-cell interference.

Various mechanisms and techniques for providing PAPR reduction in MU-MIMO transmissions with controllable interference are discussed herein. Some aspects enable PAPR reduction gains in MU-MIMO transmissions while controlling interferences in serving beam subspaces and non-serving beam subspaces. For example, a base station (BS) may generate a plurality of communication signals including user data for a plurality of UEs in a plurality of serving beam subspaces. The BS may generate a PAPR reduction signal for one or more of the plurality of communication signals. The BS may project a portion of the PAPR reduction signal onto one or more of the plurality of serving beam subspaces. The projection onto each serving beam subspace of the one or more serving beam subspaces may be based at least in part on an error vector magnitude (EVM) associated with a corresponding UE being served on the serving beam subspace. EVM may refer to a measure of error or distance between a received modulation symbol and an ideal symbols or constellation point in a constellation in-phase-quadrature-plane (I-Q) plane. The BS may also project another portion of the PAPR reduction signal onto a non-serving beam subspace. After generating the communication signals and the PAPR reduction signal, the BS may transmit the plurality of communication signals concurrent with the PAPR reduction signal to the plurality of UEs so that the resulted transmission may satisfy a target PAPR (e.g., at each antenna element of the BS).

In some aspects, the BS may serve a first UE of the plurality of UEs on a first serving beam subspace of the plurality of serving beam subspaces. The BS may serve a second UE of the plurality of UEs on a second serving beam subspace of the plurality of serving beam subspaces. The BS may project a first portion of the PAPR reduction signal onto the first serving beam subspace based on a first EVM of the first UE. Additionally or alternatively, the BS may project a second portion of the PAPR reduction signal onto the second serving beam subspace based on a second EVM of the second UE. For instance, the BS may project a smaller amount of interference onto a serving beam subspace of a UE with a higher MCS, a lower EVM margin, and/or a higher SNR than a serving beam subspace of a UE with a lower MCS, a higher EVM margin, and/or a lower SNR. The PAPR reduction signal portion(s) projected onto the serving beam subspaces creates intra-cell interference, while the PAPR reduction signal portion(s) projected onto the non-serving beam subspaces may create inter-cell interference. Accordingly, controlling the PAPR reduction signal projection onto the serving beam subspaces enables the BS to control intra-cell interference and inter-cell interference.

In some aspects, the BS may perform precoding on the data for the plurality of UEs such that the plurality of communication signals may be projected onto the serving beam subspaces. The BS may determine interference weighting for the PAPR reduction signal projection based on the UEs' EVMs. The BS may project a portion of the PAPR reduction signal onto one or more of the plurality of serving beam subspaces based on the precoding (e.g., a precoding matrix) and the interference weighting (e.g., an interference weighting matrix). In some aspects, the BS may perform the projection in a frequency domain. Accordingly, the PAPR reduction may be referred to as space-frequency PAPR reduction.

In some aspects, the BS may determine a set of spatial subspaces for PAPR reduction signal projection. The BS may transmit one or more reference signals in the set of PAPR reduction beam subspaces. The UEs may perform measurements on the one or more reference signals and reports the measure measurements to the BS. The measurement reports may include reference signal received power (RSRP), signal-to-noise ratio (SNR), channel quality indicator (CQI), target EVM, and/or an allowable EVM increase. The BS may determine the interference weighting for the PAPR reduction signal projection based on the received measurement reports. For instance, the BS may determine an allowable interference on a per-serving beam subspace basis based on a corresponding UE's EVM. In other words, the BS may optimize PAPR reduction gains while providing each target UE (in a MU-MIMO schedule) with performance satisfying the corresponding UE target performance metric (e.g., EVM).

Aspects of the present disclosure can provide several benefits. For example, controlling projections of a PAPR reduction signal onto UE serving beam subspaces based on corresponding served UEs' performance metrics (e.g., EVMs, SNRs) can optimize PAPR reduction gains while operating within the UEs' EVM budget. As such, a better MCS selection (e.g., selecting a higher order MCS) can be achieved, and thus may allow for a higher system throughput. Additionally, performing PAPR reduction with controllable intra-cell interference and inter-cell interference can allow for multi-cell coordination. For instance, a BS may control the amount of interference projected onto a non-serving beam subspace to avoid having high-power PAPR reduction beam directing to UEs in a neighboring cell. Further, allowing projection of portions of a PAPR reduction signal to a serving beam subspace can relax the constraints at the BS. While the present disclosure is discussed in the context of 5G or NR network, the present disclosure may be applied to any wireless communication network with MU-MIMO. Additionally, the present disclosure may be suitable for use in FDD and/or TDD systems.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information —reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OS. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a BS 105 and a UE 115 may communicate with each other by utilizing MIMO and beamforming techniques. For instance, the BS 105 and the UE 115 may each have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. The BS 105 and the UE 115 may each have a PA for each antenna or groups of antennas that serve to amplify an signal before outputting to corresponding antenna(s). In some examples, the BS 105 may have multi-panel antennas and the UE 115 may have a single-panel antenna. In some other examples, the BS 105 and the UE 115 may each have multi-panel antennas. The BS 205 may form beams in an array of angular directions by weighting signal phases and amplitudes at the antenna elements and may utilize the best beam to communicate with the UE 115. The best beam may refer to a high-quality beam, for example, where the beam may have a highest received signal power among a set of beams measured at the UE 115.

In some aspects, a BS 105 may spatially multiplex a set of UEs 115 for simultaneous communications. For instance, the UEs 115 in the set may be located in different geographical locations or directions relative to the BS 105. Thus, the BS 105 may communicate with the set of UEs 115 simultaneously by forming focused beams directing to corresponding directions of the UEs 115. The use of MIMO for simultaneous communications with multiple UEs 115 may be referred to as MU-MIMO. The spatial subspaces in which the focused beams are directed to may be referred to as serving beam subspaces.

In some aspects, the BS 105 may apply PAPR reduction techniques for MU-MIMO transmissions. For instance, the BS 105 may transmit signals additional to the communication signals carrying data for the set of UEs 115 for PAPR reduction. The added signals for PAPR reduction may be referred to as PAPR reduction signals. The PAPR reduction signals may be seen as distortion or interference. In some aspects, the BS 105 may project the PAPR reduction signals to spatial subspaces that are not part of the serving beam subspaces of the UEs 115 to avoid causing interference in the serving beam subspaces. The spatial subspaces that are not part of the serving beam subspaces may be referred to as non-serving beam subspaces. The non-serving beam subspaces may also be referred to as null subspace. In some aspects, the BS 105 may project part of the PAPR reduction signals onto the serving beam subspaces in addition to the non-serving beam subspaces. The BS 105 may control the amount of interference between the serving beam subspaces and the non-serving beam subspaces, for example, based on EVM reported by the UEs 115. Mechanisms for PAPR reduction in MU-MIMO transmissions with intra-cell interference and inter-cell interference control are described in greater detail herein.

Figure 2:
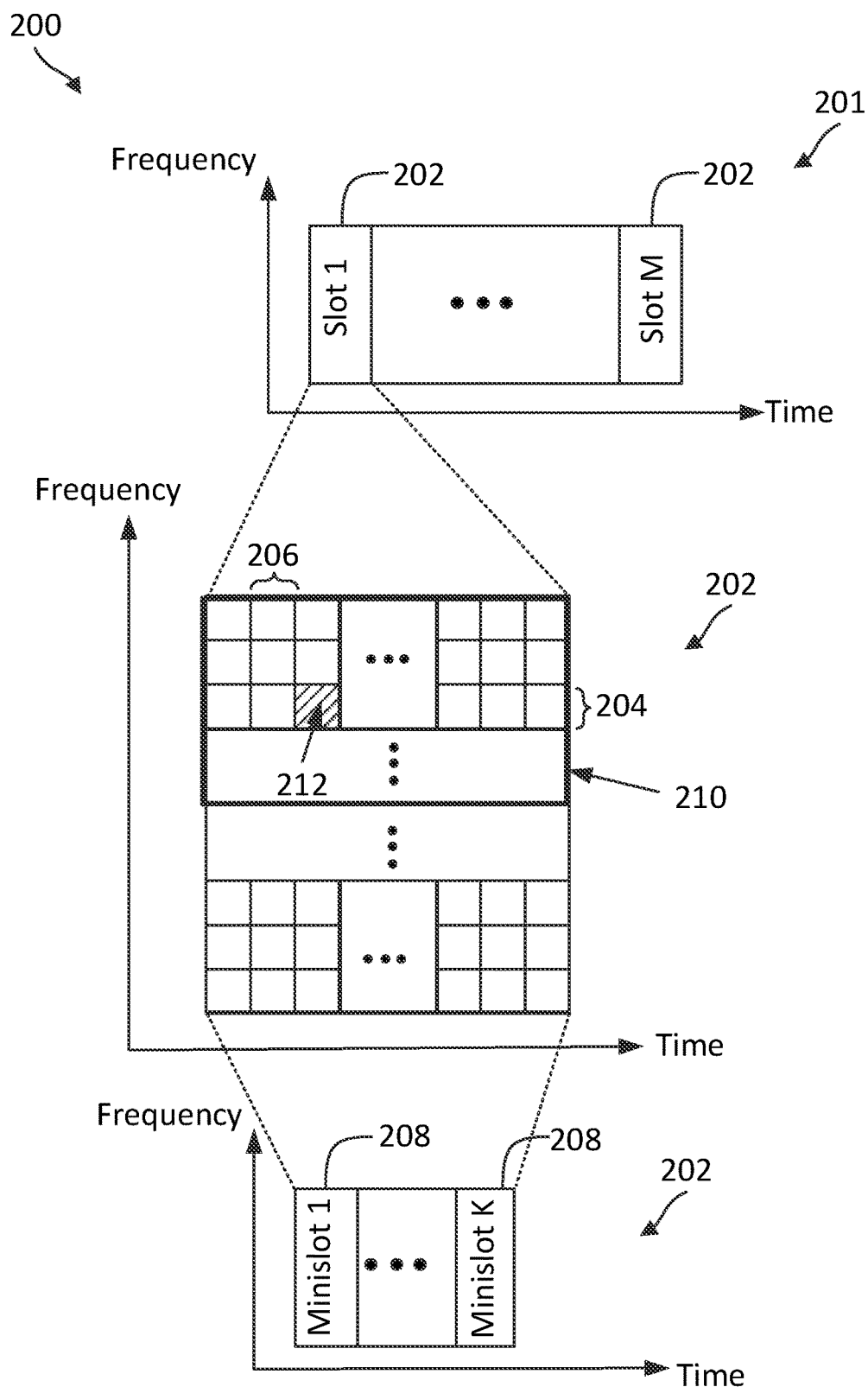
FIG. 2 illustrates a radio frame structure according to some aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
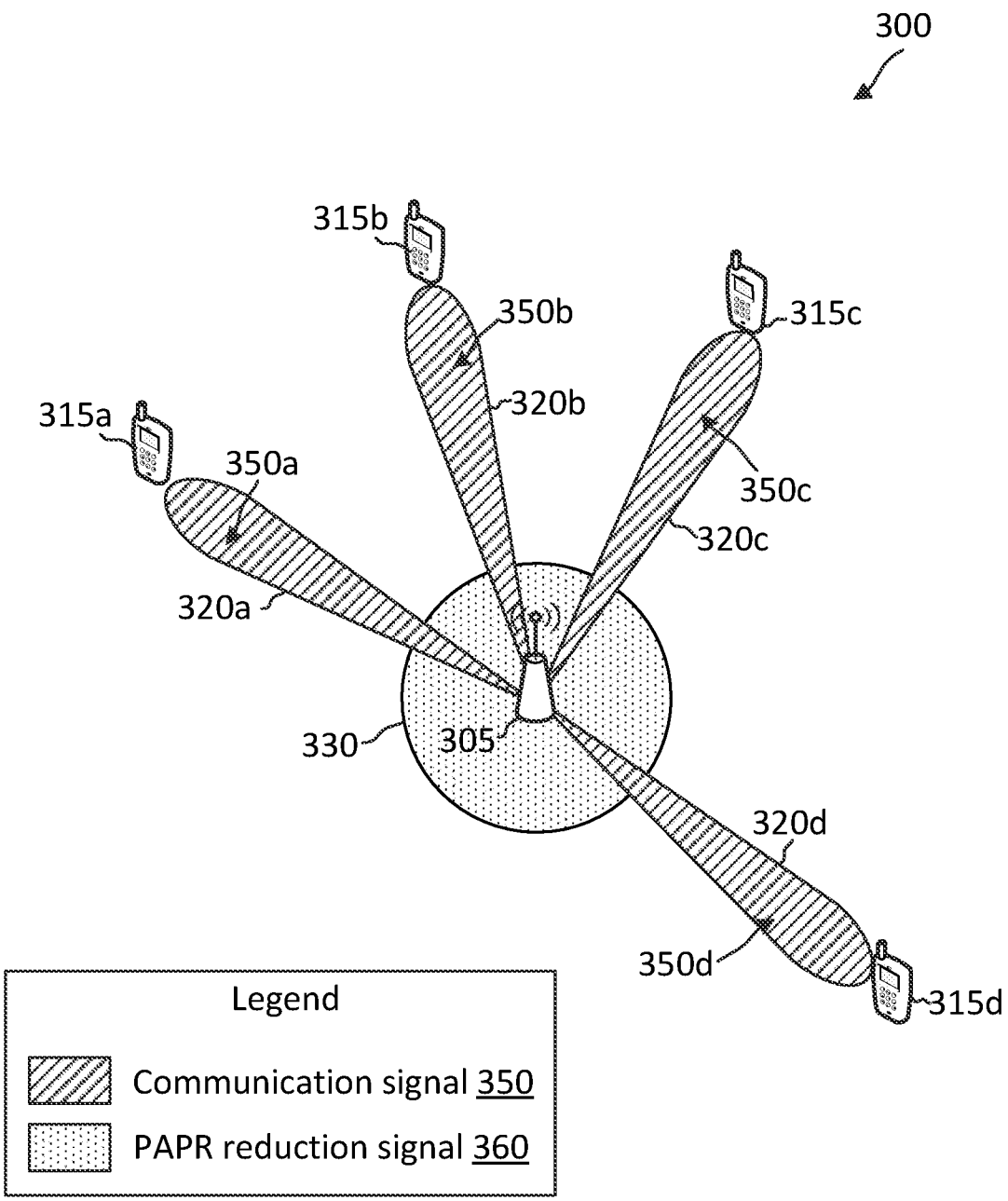
FIG. 3 illustrates a wireless communication network according to some aspects of the present disclosure.

FIG. 3 illustrates a wireless communication network 300 according to some aspects of the present disclosure. The network 300 may correspond to a portion of the network 100. Although FIG. 3 illustrates the network 300 including one BS 305 serving four UEs 315, it should be understood that in other examples the network 300 may include any suitable number of BSs 305 (e.g., about 3, 3, 4 or more) each serving any suitable number of UEs 315 (e.g., about 3, 3, 5, 6, 7, 8 or more). The BS 305 may correspond to a BS 105 in the network 100. The UEs 315 are shown as 315a, 315b, 315c, and 315d and may correspond to UEs 115 in the network 100. The BS 305 may communicate with the UEs 315 using the radio frame structure 200 of FIG. 2.

In the illustrated example of FIG. 3, the BS 305 serves UEs 315a, 315b, 315c, and 315d each located in a different geographical location. The BS 105 may schedule the UEs 315 for communications using the same time-frequency resources, but may spatially multiplex the communications with the UEs 315. For instance, the BS 305 may have an array of transmit antenna elements (e.g., the antenna 316 of FIG. 3) configured for over-the-air (OTA) transmissions. The antenna elements may be coupled to PA(s) at a radio frontend (RF) (e.g., the RF unit 314 of FIG. 3) of the BS. The BS 105 may apply beamforming to create four focused, directional beams 320, each directed in a spatial direction or beam direction towards one of the UEs 315. As shown, the beam 320a is directed to the UE 315a, the beam 320b is directed to the UE 315b, the beam 320c is directed to the UE 315c, and the beam 320d is directed to the UE 315d. The BS 305 may transmit communication signals 350 to the UEs 315a, 315b, 315c, and 315d simultaneously using the beams 320a, 320b, 320c, and 320d, respectively. For instance, the BS 305 may transmit the communication signal 350a to the UE 315a using the beam 320a, transmit the communication signal 350b to the UE 315b using the beam 320b, transmit the communication signal 350c to the UE 315c using the beam 320c, and transmit the communication 350d to the UE 315d using the beam 320d. Each communication signal 350 may include DL data (e.g., PDSCH) and/or DL control information (e.g., PDCCH) for a respective UE 315. The spatial subspaces where the four serving beams 320 are directed to may be referred to as serving beam subspaces. Beamforming may include precoding signals that are to be transmitted by the transmit antenna elements. Precoding may refer to adjusting the amplitude and/or phase of a signal at each transmit antenna element.

As discussed above, PAs may typically provide a linear performance at a lower input power, but may provide a higher power efficiency when operating at a higher input power in a non-linear region of the PA. In order to achieve a high-power efficiency at the PA, but without the non-linear distortion, the BS may generate a PAPR reduction signal 360 and project the PAPR reduction signal 360 to a spatial subspace 330 (e.g., a null space or a non-serving beam subspace) that is not part of the spatial subspaces of the four serving beams 320 (e.g., orthogonal to the four serving beams 320). In other words, the PAPR reduction signal 360 may be a pseudo omni-directional signal. In some aspects, the PAPR reduction signal 360 is a time domain signal having values that are in anti-phase with the signals 350 (generated for transmissions over the beams 320) at time locations aligned to peaks of the signals 350 in a time domain. The PAPR reduction signal 360 can be constructed such that it provides a PAPR reduction to signal at the input of each PA (e.g., preceding an antenna element or groups of antenna elements) of the BS 305.

While the PAPR reduction technique with the null space projection may achieve PAPR reduction, the scheme null space projection-based PAPR reduction technique may not perform well when there is an insufficient number of degrees of freedom, for example, when a BS does not have a sufficiently large array of transmit antenna elements or when the BS applies excessive MU-MIMO multiplexing, leaving a relatively small null space for the PAPR reduction signal projection. In addition, the null space projection-based PAPR reduction technique lacks control of the amount or level of interference that may be imposed on the non-serving beam subspace 330, and thus can impact inter-cell interference system performance.

Accordingly, the present disclosure provides techniques for performing PARR reduction in MU-MIMO transmissions with controllable intra-cell interference and inter-cell interference.

Figure 4:
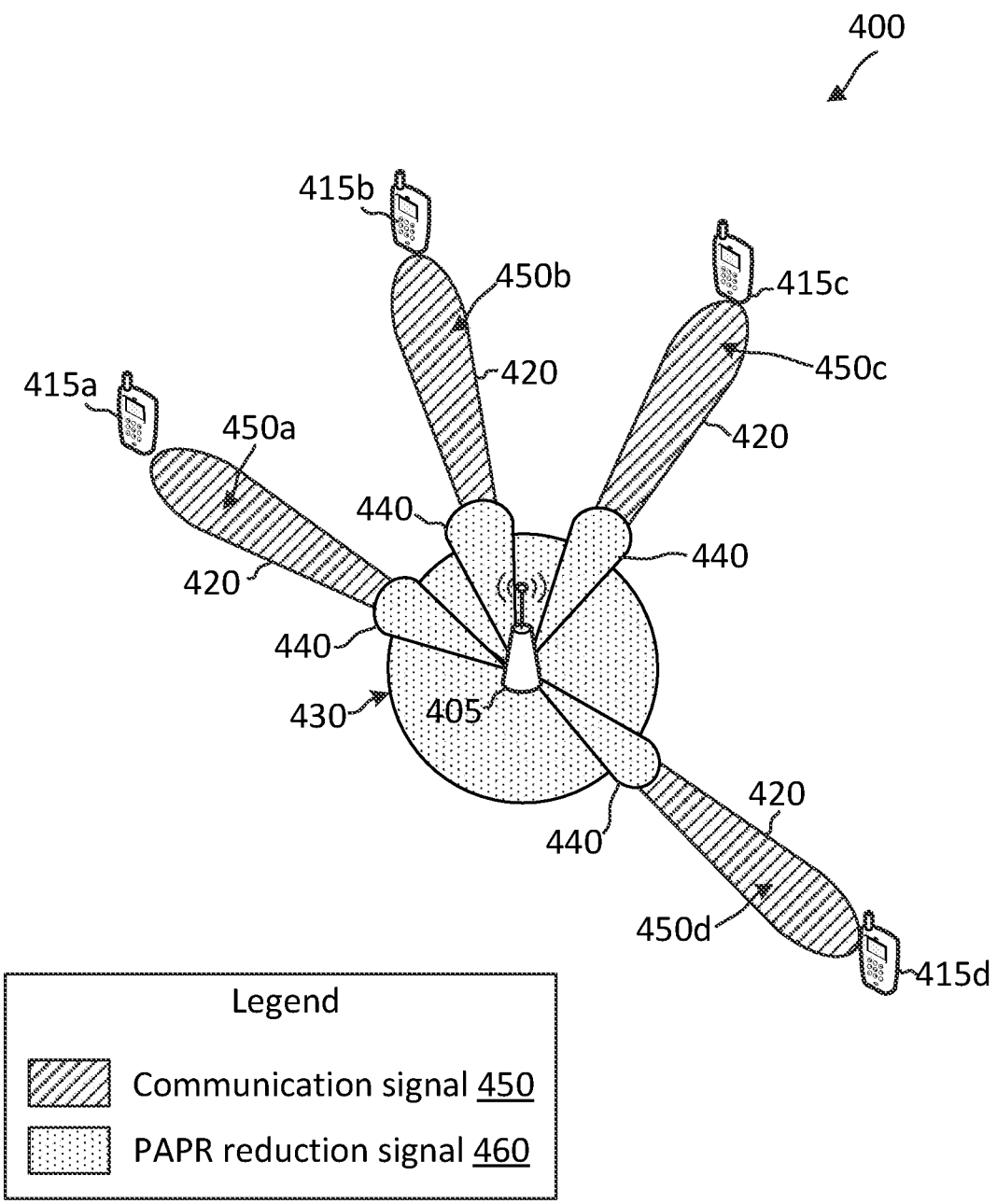
FIG. 4 illustrates a wireless communication network according to some aspects of the present disclosure.

FIG. 4 illustrates a wireless communication network 400 according to some aspects of the present disclosure. Although FIG. 4 illustrates the network 400 including one BS 405 serving with four UEs 415, it should be understood that in other examples the network 400 may include any suitable number of BSs 305 (e.g., about 3, 4, 4 or more) each serving any suitable number of UEs 315 (e.g., about 3, 4, 5, 6, 7, 8 or more). The network 400 may correspond to a portion of the network 100 and may be substantially similar to the network 300. The BS 405 may be similar to the BSs 105 and 305. The UEs 415 are shown as 415a, 415b, 415c, and 415d and may be similar to the UEs 115 and 315. The BS 405 may communicate with the UEs 415 using the radio frame structure 200 of FIG. 2.

Similar to the network 300, the BS 405 may utilize MU-MIMO techniques to communicate with the UEs 415a, 415b, 415c, and 415d. For example, the BS 405 may transmit communication signals 450a, 450b, 450c, and 450d simultaneously to the UEs 415a, 415b, 415c, and 415d, respectively, with spatial multiplexing. The communication signals 450 may be substantially similar to the communication signals 350. The BS 405 may also generate a PAPR reduction signal 460 to reduce the PAPR of a signal at the input of each PA (e.g., preceding an antenna element or groups of antenna elements) of the BS 405. However, instead of blindly projecting the PAPR reduction signal 460 onto a spatial subspace 430 orthogonal to the serving beams 420, the BS 405 may control or determine an amount of interference projected onto spatial subspaces of the serving beams 420 and an amount of interference projected onto the spatial subspace 430 of the non-serving beams or the null space.

As shown, the BS 405 projects a portion of the PAPR reduction signal 460 onto spatial subspaces of the serving beams 420 (shown by interference beams 440) and a portion of the PAPR reduction signal 460 onto a spatial subspace 430 (e.g., a null space) orthogonal to the serving beams 420. The portion of the PAPR reduction signal 460 in the null subspace 430 may be a pseudo omni-directional signal. In some aspects, the BS 405 may determine an amount or portion of the PAPR reduction signal 460 that can be projected onto a spatial subspace of a serving beam 420 based on a EVM, an SNR, and/or a MCS of a respective UE 415 being served by the beam 420. In other words, the BS 405 can control the amount of interference created by the interference beams 440.

For instance, the BS 405 may project a smaller amount of interference onto a spatial subspace of a serving beam 420 serving a UE 415 with a higher MCS, a lower EVM margin, and/or a higher SNR than a spatial subspace of a serving beam 420 serving a UE 115 with a lower MCS, a higher EVM margin, and/or a lower SNR.

In some aspects, the BS 405 may generate the communication signals 450 including data (e.g., PDSCH and/or PDCCH) for the UEs 415 in a plurality of serving beam subspaces (corresponding to the serving beams 420). The BS 405 may generate a PAPR reduction signal 460 for one or more of the communication signals 450. For instance, in some instances, the BS 405 may generate the PAPR reduction signal 460 for one communication signal 450 (e.g., the communication signal 450a), but may not provide a PAPR reduction for another communication signal 450 (e.g., the communication signal 450b). In some other instances, the BS 405 may generate the PAPR reduction signal 460 to reduce the PAPR of each communication signal 450. The BS 405 may project a portion of the PAPR reduction signal 460 to at least a spatial subspace of one of the serving beams 420 (e.g., the beam 430a) and another portion of the PAPR reduction signal 460 to the null subspace 430. In some instances, BS 405 may project a portion of the PAPR reduction signal 460 to each of the serving beam subspaces (shown by the interference beams 440) and a portion of the PAPR reduction signal 460 to the null subspace 430 as shown. In other words, the BS 405 may optimize the PAPR reduction and/or the amount of allowable interference for each active UE 415 in a MU-MIMO schedule.

After generating the PAPR reduction signal 460, the BS 405 may transmit the communication signals 450 and the PAPR reduction signal 460 concurrently or simultaneously such that the resulting PAPR at the input of each PA (e.g., preceding an antenna element or groups of antenna elements) at the BS 405 may be reduced. Mechanisms for generating the PAPR reduction signal 460 will be discussed more fully below.

As can be observed, the projection of interference onto the subspaces of the serving beams 420 is constrained by the operating conditions or requirements (e.g., EVMs, SNRs, and/or MCSs) of corresponding UEs 415, while the projection of interference onto the null subspace 430 can be unconstrained. Accordingly, the interference controlled-based PAPR reduction technique can provide a higher PAPR reduction gain while allowing the BS 405 to relax constraints at the BS 405 for multi-UE multiplexing (e.g., with respect to SNR requirements, and/or UE spatial/frequency multiplexing).

Figure 5:
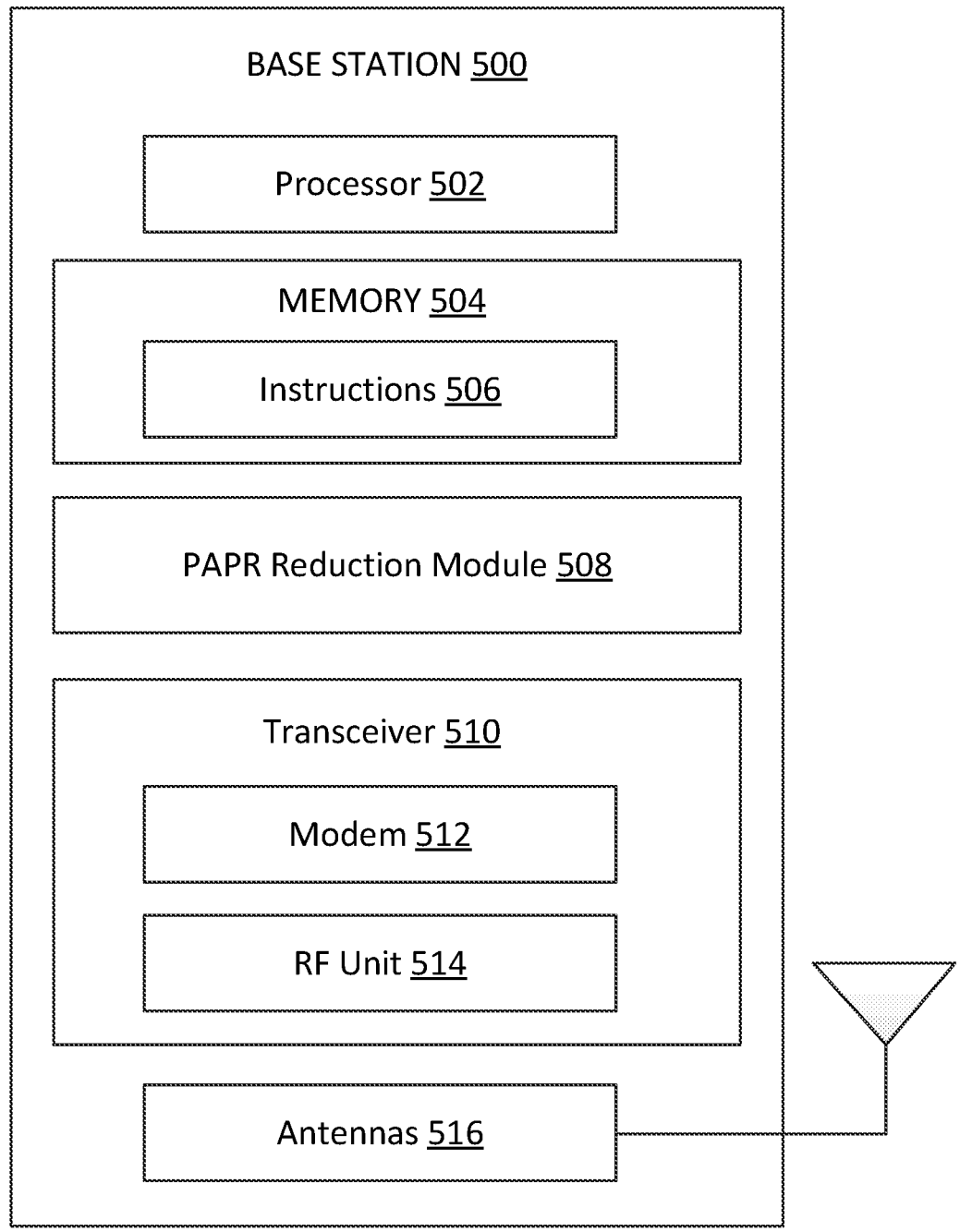
FIG. 5 is a block diagram of an exemplary base station (BS) according to some aspects of the present disclosure.

FIG. 5 is a block diagram of an exemplary BS 500 according to some aspects of the present disclosure. The BS 500 may be a BS 105 in the network 100 as discussed above in FIG. 1. As shown, the BS 500 may include a processor 502, a memory 504, a PAPR reduction module 508, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 4-9. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The PAPR reduction module 508 may be implemented via hardware, software, or combinations thereof. For example, the PAPR reduction module 508 may be implemented as a processor, circuit, and/or instructions 506 stored in the memory 504 and executed by the processor 502. In some examples, the PAPR reduction module 508 can be integrated within the modem subsystem 512. For example, the PAPR reduction module 508 can be implemented by a combination of software components (e.g., executed by a DSP or a general processor) and hardware components (e.g., logic gates and circuitry) within the modem subsystem 512.

The PAPR reduction module 508 may be used for various aspects of the present disclosure, for example, aspects of FIGS. 4-9. The PAPR reduction module 508 is configured to generate a plurality of communication signals including user data for a plurality of UEs (e.g., the UEs 115, 315, 415, and/or 600) in a plurality of serving beam subspaces. The PAPR reduction module 508 may also be configured to generate a PAPR reduction signal for one or more of the plurality of communication signals. The PAPR reduction module 508 may also be configured to project a portion of the PAPR reduction signal onto one or more of the plurality of serving beam subspaces based at least in part on one or more EVMs of one or more of the plurality of UEs. The PAPR reduction module 508 may also be configured to project another portion of the PAPR reduction signal onto a non-serving beam subspace. The PAPR reduction module 508 may also be configured to transmit the plurality of communication signals concurrent with the PAPR reduction signal to the plurality of UEs so that the resulted transmission may satisfy a target PAPR. In some aspects, the target PAPR may be based on PA(s) at the RF unit 514. For instance, the target PAPR may be set such that the PA(s) may operate in a linear region of the PA(s).

In some aspects, the PAPR reduction module 508 may be configured to serve a first UE of the plurality of UEs on a first serving beam subspace of the plurality of serving beam subspaces. The PAPR reduction module 508 may also be configured to serve a second UE of the plurality of UEs on a second serving beam subspace of the plurality of serving beam subspaces. The PAPR reduction module 508 may be configured to project a first portion of the PAPR reduction signal onto the first serving beam subspace based on a first EVM of the first UE. The PAPR reduction module 508 may also be configured to project a second portion of the PAPR reduction signal onto the second serving beam subspace based on a second EVM of the second UE. For instance, the PAPR reduction module 508 may be configured to project a smaller amount of interference onto a serving beam subspace of a UE with a higher MCS, a lower EVM margin, and/or a higher SNR than a serving beam subspace of a UE with a lower MCS, a higher EVM margin, and/or a lower SNR.

In some aspects, the PAPR reduction module 508 may be configured to perform precoding on the data for the plurality of UEs such that the plurality communication signals may be projected onto the serving beam subspaces. The PAPR reduction module 508 may also be configured to determine interference weighting for the PAPR reduction signal projection based on the UEs' EVMs. The PAPR reduction module 508 may also be configured to project a portion of the PAPR reduction signal onto one or more of the plurality of serving beam subspaces based on the precoding (e.g., a precoding matrix) and the interference weighting (e.g., an interference weighting matrix). In some aspects, the PAPR reduction module 508 may also be configure to perform the projection in a frequency domain.

In some aspects, the PAPR reduction module 508 may be configured to determine a set of spatial subspaces for PAPR reduction signal projection and transmit one or more reference signals in the set of PAPR reduction beam subspaces. The PAPR reduction module 508 also be configured to receive measurement reports from one or more of the plurality of UEs. Each measurement report may include one or more of RSRPs, SNR, CQI, and/or EVM associated with a corresponding UE. The PAPR reduction module 508 may be configured to determine the interference weighting for the PAPR reduction signal projection based on the received measurement reports. Mechanisms for performing PAPR reduction for MU-MIMO transmissions with controllable interference are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PDSCH signal, PDCCH signal, DL data, scheduling grants, RRC configurations, reference signals, pilot pattern configurations, measurement report requests) from the modem subsystem 512 (on outbound transmissions) or of transmissions originating from another source such as a UE 115, 315, 415 and/or UE 600. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to some aspects of the present disclosure. The antennas 516 may further receive data messages transmitted from other devices and provide the received data messages for processing and/or demodulation at the transceiver 510. The transceiver 510 may provide the demodulated and decoded data (e.g., PUSCH signal, UL data, measurement reports) to the PAPR reduction module 508 for processing. The antennas 516 may include multiple antennas of similar or different designs to sustain multiple transmission links. In some aspects, the RF unit 514 may include one or more PAs each coupled to an antenna 516 or a group of antennas 516. The PAs may be configured to amplify outbound signals prior to transmissions over the air via the antennas 516.

In some aspects, the processor 502 may be configured to coordinate with the PAPR reduction module 508 to generate a plurality of communication signals including data for a plurality of UEs in a plurality of serving beam subspace. The processor 502 may also be configured to coordinate with the PAPR reduction module 508 to generate a PAPR reduction signal for one or more of the plurality of communication signals. The first portion of the PAPR reduction signal may be in a first serving beam subspace of the plurality of serving beam subspaces based on a first EVM associated with a first UE of the plurality of UEs and a second portion of the PAPR reduction signal may be in a non-serving beam subspace. The transceiver 510 may be configured to coordinate with the PAPR reduction module 508 to transmit, to the plurality of UEs, the plurality of communication signals and the PAPR reduction signal.

In some aspects, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

Figure 6:
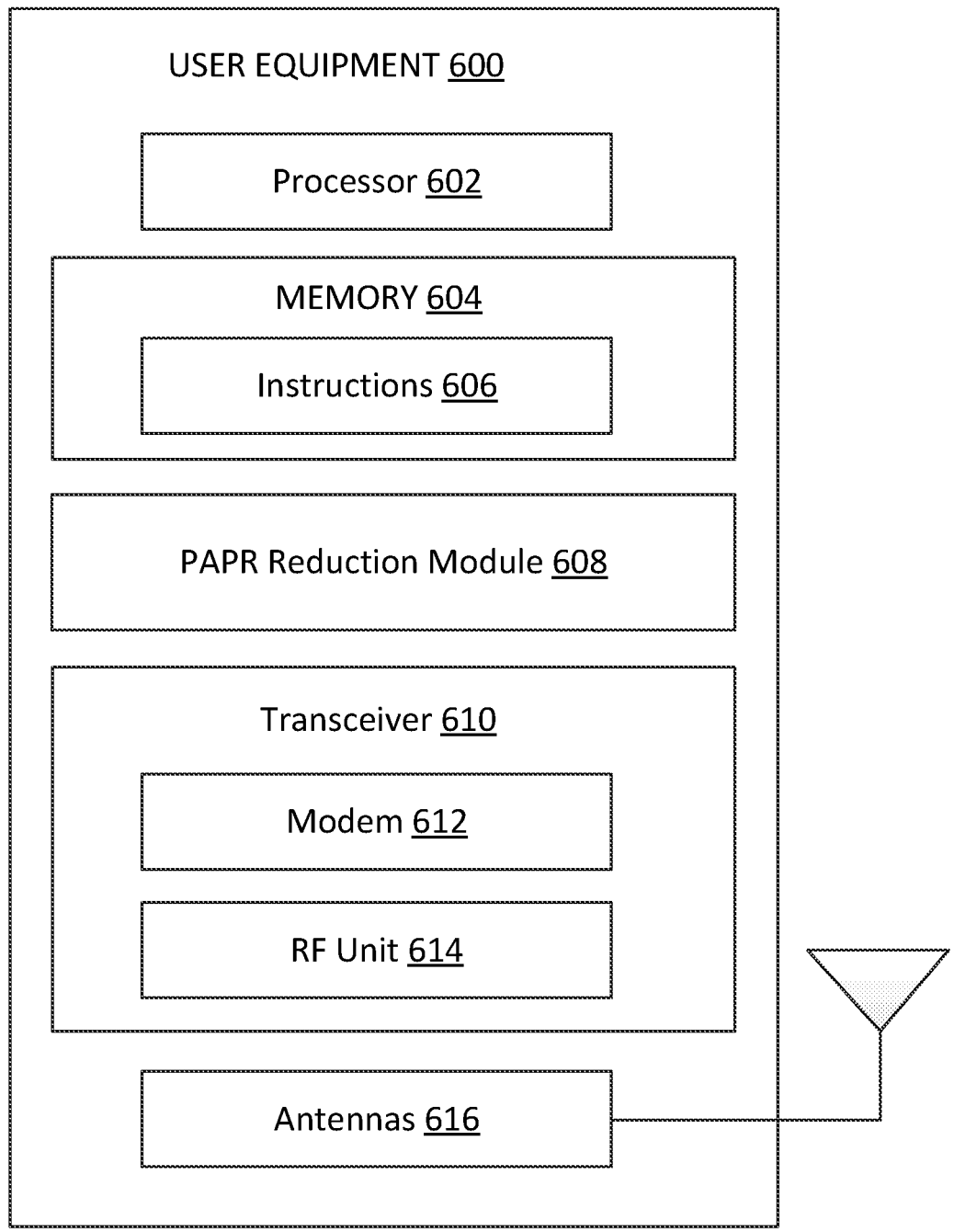
FIG. 6 is a block diagram of an exemplary user equipment (UE) according to some aspects of the present disclosure.

FIG. 6 is a block diagram of an exemplary UE 600 according to some aspects of the present disclosure. The UE 600 may be a UE 115 discussed above in FIG. 1. As shown, the UE 600 may include a processor 602, a memory 604, a PAPR reduction module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 4-8 and 10. Instructions 606 may also be referred to as program code, which may be interpreted broadly to include any type of computer-readable statement(s) as discussed above with respect to FIGS.

The PAPR reduction module 608 may be implemented via hardware, software, or combinations thereof. For example the PAPR reduction module 608 may be implemented as a processor, circuit, and/or instructions 606 stored in the memory 604 and executed by the processor 602. In some examples, the PAPR reduction module 608 can be integrated within the modem subsystem 612. For example, the PAPR reduction module 608 can be implemented by a combination of software components (e.g., executed by a DSP or a general processor) and hardware components (e.g., logic gates and circuitry) within the modem subsystem 612.

The PAPR reduction module 608 may be used for various aspects of the present disclosure, for example, aspects of FIGS. 4-8 and 10. The PAPR reduction module 608 is configured to receive, from a BS (e.g., the BSs 105, 305, 405, and/or 500), a plurality of reference signals in a set of PAPR reduction beam subspaces. In some aspects, the plurality of reference signals may include a first reference signal and a second reference signal each having a different pilot pattern. The PAPR reduction module 608 may also be configured to transmit, to the BS, a measurement report based one or more of the plurality of reference signals. The measurement report may include at least one of a RSRP, a SNR, a CQI, and/or a EVM associated with the UE 600. The PAPR reduction module 608 may also be configured to receive, from the BS, a communication signal based on the measurement report, the communication signal satisfying a target PAPR. In some aspects, the communication signal may be in a serving beam subspace that is non-overlapping with the set of PAPR reduction beam subspaces. In some aspect, the communication signal may be in a serving beam subspace that is at least partially overlapping with the set of PAPR reduction beam subspaces. Mechanisms in assisting a BS in performing PAPR reduction in MU-MIMO transmission with controllable interference are described in greater detail herein.

As shown, the transceiver 610 may include a modem subsystem 612 and an RF unit 614. The transceiver 610 can be configured to communicate bi-directionally with other devices, such as the BSs 105. The modem subsystem 612 may be configured to modulate and/or encode the data from the memory 604 and/or the PAPR reduction module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUSCH signal, UL data, measurement reports) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., PDSCH signal, PDCCH, DL data, scheduling grants, RRC configuration, reference signals, pilot pattern configurations) to the PAPR reduction module 608 for processing. The antennas 616 may include multiple antennas of similar or different designs in order to sustain multiple transmission links. The RF unit 614 may configure the antennas 616.

In some aspects, the transceiver 610 may be configured to coordinate with the PAPR reduction module 608 to receive, from a BS, a plurality of reference signals in a set of PAPR reduction beam subspaces. The transceiver 610 may also be configured to coordinate with the PAPR reduction module 608 to transmit, to the BS, a measurement report based on at least a first reference signal of the plurality of reference signals. The transceiver 610 may also be configured to coordinate with the PAPR reduction module 608 to receive, from the BS, a communication signal based on the measurement report, the communication signal satisfying a target PAPR.

In some aspects, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
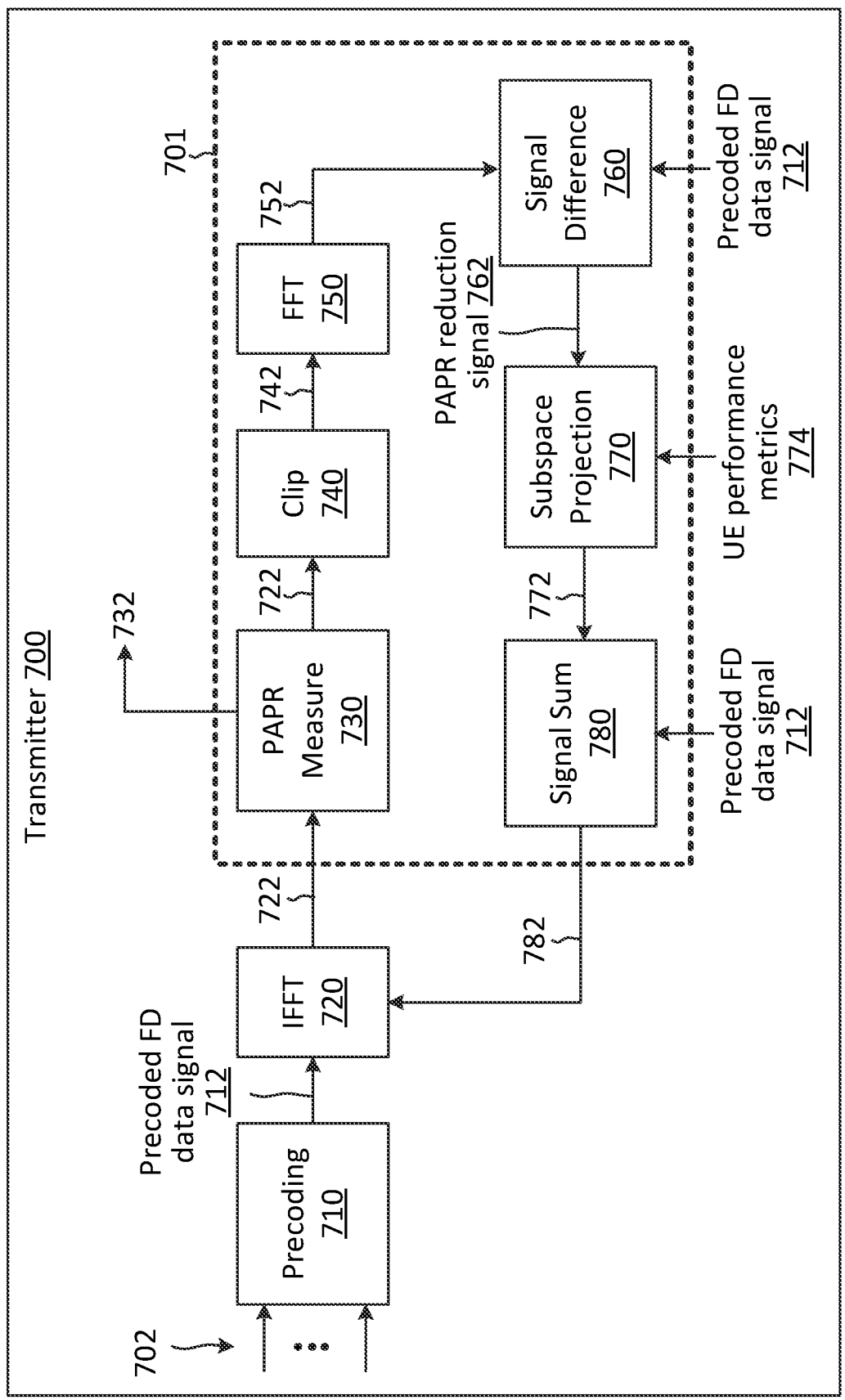
FIG. 7 is a block diagram of an exemplary multi-user-multiple-input multiple-output (MU-MIMO) transmitter according to some aspects of the present disclosure.

FIG. 7 illustrates an exemplary MU-MIMO transmitter 700 according to some aspects of the present disclosure. The transmitter 700 may correspond to a transmitter at a BS such as the BSs 105, 405, and/or 400. The transmitter 700 may apply OFDM techniques to generate OFDM signals for MU-MIMO transmissions, for example, using the radio frame structure 200 as discussed above in relation to FIG. 2. The transmitter 700 may perform PAPR reduction on the MU-MIMO transmissions with controlled interference, for example, using similar mechanisms as discussed above in relation to FIG. 4.

At a high level, the transmitter 700 is configured to generate a plurality of communication signals for a plurality of MU-MIMO UEs such as the UEs 115, 315, 415, and/or 400 in a plurality of serving beam subspaces. The transmitter is also configured to generate a PAPR reduction signal for one or more of the plurality of communication signals and project a portion of the PAPR reduction signal onto one or more of the serving beam subspaces and another portion of the PAPR reduction signal onto a non-serving beam subspace (that is not part of the plurality of serving beam spaces) based on one or more of the UEs' EVMs.

As shown, the transmitter 700 includes a precoding block 710, an inverse fast Fourier transform (IFFT) block 720, a PAPR measurement block 730, a clipping block 740, a fast Fourier transform (FFT) block 750, a signal difference block 760, a subspace projection block 770, and a signal sum block 780. The precoding block 710, the IFFT block 720, the PAPR measurement block 730, the clipping block 740, the FFT block 750, the signal difference block 760, the subspace projection block 770, and the signal sum block 780 may be implemented via hardware, software, or combinations thereof. In some aspects, one or more of the precoding block 710, the IFFT block 720, the PAPR measurement block 730, the clipping block 740, the FFT block 750, the signal difference block 760, the subspace projection block 770, and the signal sum block 780 can be implemented by the transceiver 510 and/or the PAPR reduction module 508 of FIG. 5.

At the transmitter 700, the precoding block 710 is configured to receive a plurality of data streams 702. Each data stream 702 may include a sequence of frequency domain data symbols. For simplicity of discussion, the data streams 702 are for transmission over one OFDM symbol (e.g., the symbol 206). Each data stream 702 may be associated with a UE (e.g., the UEs 415a, 415b, 415c, and 415d) participating in a MU-MIMO transmission. Each data stream 702 may carry information data for a respective UE in a certain spatial layer. A UE may be served one or more data streams 702 (e.g., in in one or more spatial layers). For instance, for four UEs each being served with two data streams 702, the precoding block 710 may receive eight data streams 702. The information data may be encoded and modulated according to a MCS. In some examples, QAM-based modulation schemes (e.g., 4QAM, 8QAM, 16QAM, 256QAM) may be used, and thus the data symbols in the data streams 702 may be QAM symbols. Each QAM symbol or data symbol may be mapped to a frequency subcarrier (e.g., the subcarriers 204) for transmission. Each data stream 702 may be generated independently. Thus, different data streams 702 may be generated using different MCSs, for example, depending on an operating condition such as a EVM and/or a SNR associated with a corresponding UE. For instance, a high-order MCS such as 64QAM may be used for a UE with a high SNR (e.g., satisfying a threshold), and a low-order MCS such as 4QAM may be used for a UE with a low SNR.

The precoding block 710 is further configured to pre-code the data streams 702 of different UEs into different spatial subspaces or transmit directions (e.g., the beams 420). For instance, the precoding block 710 may apply a precoding matrix, denoted as W, to the data streams 702, denoted as x, shown below in equation (1):

$$z = W \times x, \quad (1)$$

where z represents pre-coded frequency domain (FD) data signals 712 output by the precoding block 710. The precoding matrix may have a dimension of P×B, where P represents the number of transmit antenna elements (e.g., the antennas 516) at the transmitter 700 and B represents the number of served layers (e.g., the number of data streams 702). The precoding block 710 may produce P quantity of signals 712, each for transmission over one of the P antenna elements. The precoding matrix W may be configured to match a channel condition between the transmitter 700 and the served UEs. For example, the precoding matrix W may include amplitude weightings and/or phase weightings that steer the signal at each transmit antenna element such that each data stream 702 is transmitted in a beam direction (or a serving beam subspace) directing towards a corresponding UE.

As an example, the BS 405 of FIG. 4 may have 64 transmit antenna elements and may serve two data streams 702 to each of the four UEs 415. The precoding block 710 is configured to generate 64 FD data signals 712 from the eight data streams 702, each for transmission over one of the antenna elements. The precoding matrix W is constructed so that the 64 signals may be transmitted at the same time, one from each antenna element, such that the data streams 702 are projected in directions or spatial subspaces of corresponding UEs 415. For instance, data streams 702 for the UE 415a may be carried in the communication signal 450a transmitted in the beam direction of the beam 420a, data streams 702 for the UE 415b may be carried in the communication signal 450b transmitted in the beam direction of the beam 420b, and so on.

The IFFT block 720 is configured to perform an IFFT to transform each FD data signal 712 to a time domain signal 722 as shown below:

$$a = \text{IFFT}\{z\}, \quad (2)$$

where a represents time domain (TD) signals 722 output by the IFFT block 720. In some instances, the IFFT block 720 can apply zero padding to the FD data signals 712 before performing an IFFT to provide oversampling. Although the IFFT block 720 is shown as a single block, it should be understood that in other examples, the transmitter 700 may include multiple transmit processing chains and may include multiple IFFT blocks 720 each operating on one of the FD signals 712 at the same time (e.g., for parallel processing).

The PAPR measurement block 730, the clipping block 740, the FFT block 750, the signal difference block 760, the subspace projection block 770, and the signal sum block 780 form a PAPR reduction processing section 701 that operates on the TD signals 722 to reduce a PAPR of the TD signals 722 before transmission (e.g., to PA(s) and transmit antennas). The PAPR measurement block 730 is configured to compute a PAPR for the TD signals 722. The PAPR measurement block 730 may also be configured to determine whether the PAPR has converged (e.g., satisfying a target PAPR). If the PAPR of the time domain signals satisfies the target PAPR, the PAPR measurement block 730 may terminate the PAPR reduction processing and output the TD signal 722 for transmission. Upon satisfying the target PAPR, the transmitter 700 may transfer the TD signal 722 further down the transmitter processing chain, for example, to perform CP addition and prepare a communication signal (e.g., the communication signals 310) for transmission over the air. If the PAPR of the time domain signals fails to satisfy the target PAPR, the transmitter 700 may transfer the TD signals 722 to the clipping block 740.

The clipping block 740 is configured to apply a clipping function to the TD signals 722 as shown below in equation (3):

$$\hat{a} = \text{clip}\{a\}, \quad (3)$$

where $\hat{a}$ represents clipped TD signals 742 output by the clipping block 740. The clipping function may clip each time TD signal 722 according to a maximum value, denoted as V1, and a minimum value, denoted as V2. For instance, if a value in a TD signal 722 is greater than V1, the value is set to V1. Conversely, if a value in a TD signal 722 is less than V2, the value is set to V2. The clipping reduces the dynamic range of the TD signals 722, and thus reduces the PAPR of the TD signals 722.

The FFT block 750 is configured to perform an FFT to transform each clipped TD signal 742 into a frequency domain as shown below in equation 4):

$$\hat{z} = \text{FFT}\{\hat{a}\}, \quad (4)$$

where $\hat{z}$ represents FD signals 752 output by the FFT block 750. In some instances, if the IFFT block 720 includes oversampling, the FFT block 750 may include downsampling after the FFT. Although the FFT block 750 is shown as a single block, it should be understood that in other examples, the transmitter 700 may include multiple transmit processing chains and may include multiple FFT blocks 750 each operating on one of the clipped TD signals 742 at the same time (e.g., for parallel processing).

The signal difference block 760 is configured to compute a difference between the pre-coded FD data signals 712 (generated by the precoding block 710) and the FD signals 752 after the time-domain clipping. The difference signal may be represented as $(\hat{z}-z)$ and may be output as a PAPR reduction signal 762 (e.g., the PAPR reduction signals 360 and/or 460). When the PAPR reduction signal 762 is added to the original FD data signal 712, the combined signal may produce the PAPR-reduced signal $\hat{z}$.

The subspace projection block 770 is configured to perform subspace projection on the PAPR reduction signal 762. The subspace projection block 770 is configured to project a portion of the PAPR reduction signal 762 to a serving beam subspace and another of the PAPR reduction signal 762 to a non-serving beam subspace orthogonal to the serving beam subspaces. The projection is a frequency domain projection and may be performed as shown below in equation (5):

$$e = ((I - WW^{pinv}) + W\Lambda W^{pinv})(\hat{z}-z), \quad (5)$$

where e represents the PAPR reduction signal 762 after the projection, $\Lambda$ is a diagonal weight matrix with diagonal elements $\Lambda_{ii}$ representing a weight for interference on the $i^{th}$ layer, $(I - WW^{pinv})$ represents the non-serving beam subspace (e.g., the null spaces 330 and/or 430), and $W\Lambda W^{pinv}$ represents serving beam subspaces (e.g., subspaces of the beams 320 and/or 420). In other words, $(W\Lambda W^{pinv})(\hat{z}-z)$ corresponds to the portion of the PAPR reduction signal 762 projected onto the serving beam subspaces and $(I - WW^{pinv})(\hat{z}-z)$ corresponds to the portion of the PAPR reduction signal 762 projected onto the non-serving beam subspace.

Referring to the example shown in FIG. 4, the PAPR reduction signal portion projected onto the serving beam subspace may correspond to the portion of the PAPR reduction signal 360 over the interference beam 440. The PAPR reduction signal portion projected onto the non-serving beam subspace may correspond to the portion of the PAPR reduction signal 360 in the null subspace 430.

In some aspects, the subspace projection block 770 is also configured to receive performance metrics 774 (e.g., EVM budgets, SNRs, and/or MCSs) of the UEs in a MU-MIMO schedule. The subspace projection block 770 is configured to determine the diagonal weight matrix $\Lambda$ according to the performance metrics 774. For instance, the subspace projection block 770 may be configured to determine an amount of interference (e.g., EVM distortion) allowable in each of the serving beam subspace based on a performance metric 774 for a corresponding UE in the serving beam subspace. The subspace projection block 770 may be configured to set $\Lambda_{ii}$ for each layer according to a corresponding allowable amount of interference such that the performance is met at each UE. In an example, when a first UE has a lower EVM margin than a second UE, an interference weighting $\Lambda_{ii}$ for an $i^{th}$ layer corresponding to the first UE may have a smaller value than an interference weighting $\Lambda^{jj}$ for a $j^{th}$ layer corresponding to the second UE. In another example, when a first UE has a lower SNR than a second UE, an interference weighting $\Lambda_{ii}$ for an $i^{th}$ layer corresponding to the first UE may have a smaller value than an interference weighting $\Lambda_{jj}$ for a $j^{th}$ layer corresponding to the second UE. In a further example, when a first UE is scheduled with a higher order MCS than a second UE, an interference weighting $\Lambda_{ii}$ for an $i^{th}$ layer corresponding to the first UE may have a smaller value than an interference weighting $\Lambda_{jj}$ for a $j^{th}$ layer corresponding to the second UE.

The signal sum block 780 is configured to combine the projected PAPR reduction signal 772 with the pre-coded FD data signals 712 (generated by the precoding block 710) to produce FD signals 782. The FD signals 782 are fed back to the IFFT block 720. When the FD signals 782 is converted to a time domain, the PAPR of corresponding TD signals includes a reduced PAPR. The PAPR measurement block 730 may measure the PAPR of the TD signals and determine whether the PAPR satisfies a target PAPR (e.g., determined based on PA(s) used by the transmitter 700 for transmissions). If the target PAPR is satisfied, the transmitter 700 may transmit the TD signals. Conversely, if the PAPR of the TD signals is higher than the target PAPR, another iteration may be performed using the clipping block 740, the FFT block 750, the signal difference block 760, the subspace projection block 770, and signal sum block 780. The operations in the PAPR reduction processing section 701 can be repeated until the TD signals 722 output by the IFFT block 720 satisfies the target PAPR. In other words, the transmitter 700 may iterate as shown below in equation (6) until IFFT$\{z_{next}\}$ outputs a TD signal 722 with a PAPR satisfying the target PAPR:

$$z_{next} = ((I - WW^{pinv}) + W\Lambda W^{pinv}))(\hat{z} - z) + z, \qquad (6)$$

where $z_{next}$ represents the FD signals 782 after performing PAPR reduction in a time domain.

Figure 8:
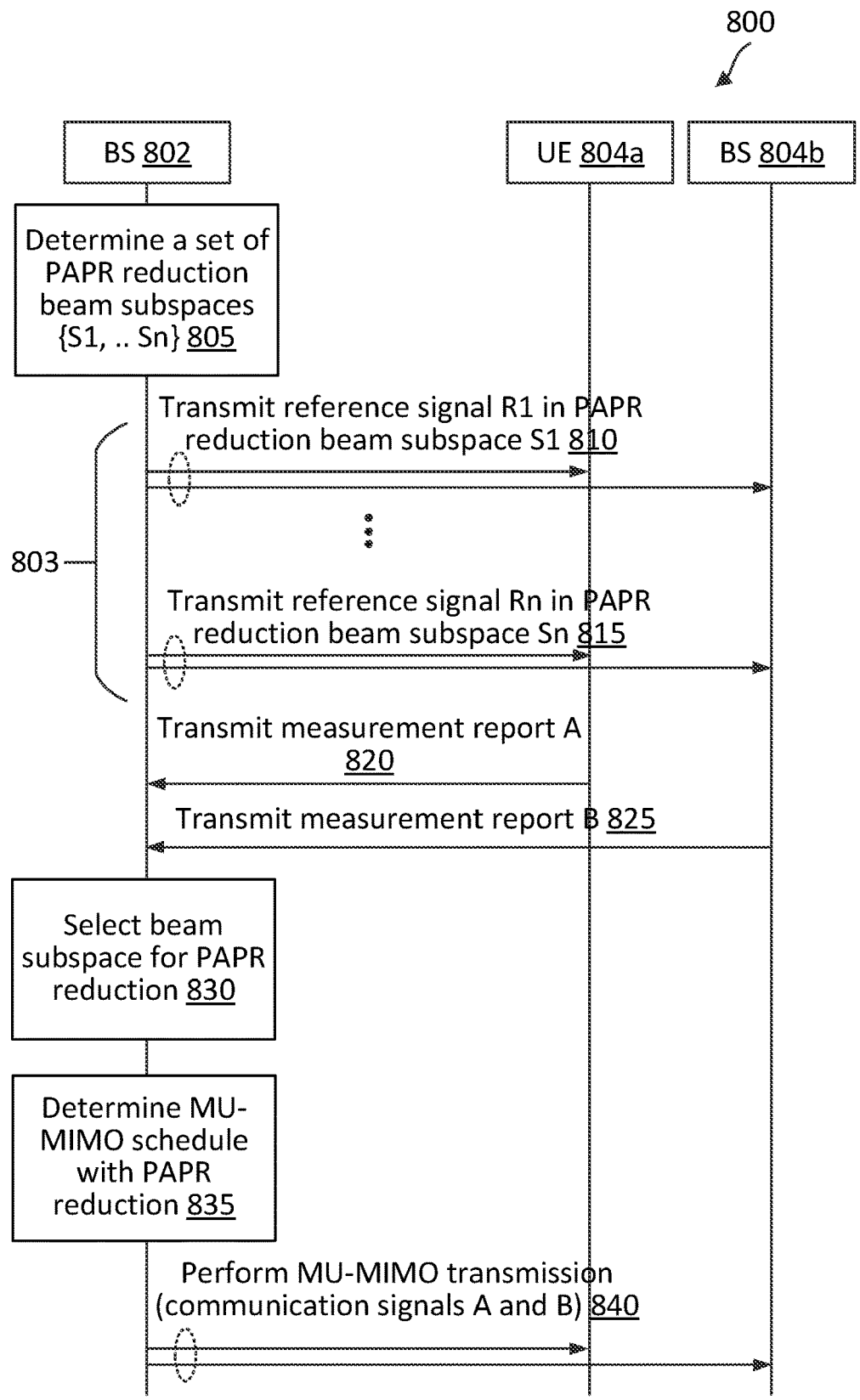
FIG. 8 is a signaling diagram illustrating a MU-MIMO communication method according to some aspects of the present disclosure.

FIG. 8 is a signaling diagram illustrating a MU-MIMO communication method 800 according to some aspects of the present disclosure. The method 800 may be implemented between a BS 802 and two MU-MIMO UEs 804 (shown as 804a and 804b). The BS 802 may be similar to the BSs 105, 305, and/or 405. The UEs 804 may be similar to the UEs 115, 315, and/or 415. The BS 802 and the UEs 804 may communicate with each other using the radio frame structure 200 of FIG. 2. Although the method 800 illustrates the BS 802 in communications with two MU-MIMO UEs 804, it should be understood that in other examples the BS 802 may communicate with any suitable number of MU-MIMO UEs 804 (e.g., about 3, 4, 5, 6 or more). As illustrated, the method 800 includes a number of enumerated actions, but embodiments of the method 800 may include additional actions before, after, and in between the enumerated actions. In some embodiments, one or more of the enumerated actions may be omitted or performed in a different order.

At a high level, in the method 800, the BS 802 may utilize PAPR reduction mechanisms as discussed above in relation to FIGS. 3 and 7 to generate MU-MIMO transmissions with a reduced PAPR. The BS 802 may receive measurement reports (e.g., including EVM margins, SNRs, RSRPs, CQIs) from the UEs 804 and optimize PAPR reduction gains while operating within a EVM margin of each UE 804 (satisfying a target PAPR and UE performance metrics).

At action 805, the BS 802 determines a set of PAPR reduction beam subspaces, which may be represented as {S1, S2, . . . , Sn}, that can be used for PAPR reduction. In some aspects, a UE serving beam subspace (e.g., a subspace of a serving beam 320 or 420) and/or a non-serving beam subspace (e.g., the null subspace 330 and/or 430) can be part of the PAPR reduction beam subspaces. In other words, a UE serving beam subspace and/or a non-serving beam subspace can be at least partially overlapping with the set of PAPR reduction beam subspaces. In some examples, aspects of the action 805 may be performed by a PAPR reduction module 508 as described with reference to FIG. 5.

At action 810, the BS 802 transmits a reference signal, denoted as R1, in the PAPR reduction subspace S1. The reference signal R1 may reach the UE 804a and the UE 804b. The reference signal R1 may be a predetermined sequence known to the BS 802 and UEs 804. The reference signal may include a set of known pilots or pilot symbols that are distributed in time and/or frequency according to a predetermined pattern. In other words, the pilots may be decimated in time and/or frequency. For instance, the reference signal R1 may include a pilot symbol at every other frequency subcarrier (e.g., the frequency subcarriers 204) in every third OFDM symbol (e.g., the symbol 206) within a certain slot (e.g., the slots 202). In some instances, the reference signal R1 can be a CSI-RS. The BS 802 may perform precoding or beamforming such that the reference signal R1 is transmitted in a beam direction corresponding to the PAPR reduction subspace S1. In some examples, aspects of the action 810 may be performed by a PAPR reduction module 508 as described with reference to FIG. 5.

The BS 802 may transmit a reference signal in each PAPR reduction beam subspace. For instance, the BS 802 may transmit a reference signal R2 in the PAPR reduction beam subspace S2, a reference signal R3 in the PAPR reduction beam subspace S3, and so on. For instance, at action 815, the BS 802 transmits a reference signal Rn in the last PAPR reduction beam subspace Sn in the set of PAPR reduction beam subspaces. In some examples, aspects of the action 815 may be performed by a PAPR reduction module 508 as described with reference to FIG. 5.

In some aspects, each of the reference signals R1, R2, R3, . . . , Rn may have a unique signature associated with a corresponding PAPR reduction beam subspace. For instance, the reference signal R1 may include pilots arranged in a first pilot pattern associated with the PAPR reduction beam subspace S, the reference signal R2 may include pilots arranged in a second pilot pattern associated with the PAPR reduction beam subspace S2, and so on. The first pilot pattern is different from the second pilot pattern. For example, the first pilot pattern may have a different time distribution and/or frequency distribution pattern. In some aspects, the BS 802 may broadcast information associated with pilot patterns for the set of PARP reduction beam subspace {S1, S2, . . . Sn}.

At action 820, the UE 804a transmits a measurement report A based on one or more of the reference signals R1, R2, . . . , Rn. The measurement report A may include a target EVM, a L1-RSRP, a CQI, and/or a SNR measured from at least one of the reference signals R1, R2, . . . , Rn. In some aspects, each PAPR reduction beam subspaces may be identified by a beam subspace index and the UE 804a may report the N PAPR reduction beam subspaces providing the strongest L1-RSRP by indicating corresponding beam subspace indexes in the measurement report. In some examples, aspects of the action 820 may be performed by a PAPR reduction module 608 as described with reference to FIG. 6.

At action 825, the UE 804b transmits a measurement report B based on one or more of the reference signals R1, R2, . . . , Rn. Similarly, the measurement report B may include a target EVM, a L1-RSRP, a CQI, and/or a SNR measured from at least one of the reference signals R1, R2, . . . , Rn. In some aspects, the UE 804b may also report the N PAPR reduction beam subspaces providing the strongest L1-RSRP. In some examples, aspects of the action 825 may be performed by a PAPR reduction module 608 as described with reference to FIG. 6.

At action 830, after receiving the measurement reports A and B, the BS 802 selects beam subspaces for PAPR reduction based on the received measurement reports A and/or B. For instance, the BS 802 may determine which of the PAPR reduction beam subspaces are part of a null space and which of the PAPR reduction beam subspaces are partially received by the UE 804*a* and/or UE 804*b* based on the measurement reports A and/or B. The BS 802 may select UE serving beam subspaces based on the PAPR beam subspaces that are partially received by the UE 804*a* and/or UE 804*b*. The BS 802 may limit the amount of PAPR reduction signal to be projected onto the UE serving beam subspaces based on the measurement reports A and/or B.

At action 835, the BS 802 determines a MU-MIMO schedule for communicating with the UEs 804*a* and 804*b*. The BS 802 may take PAPR reduction into account when determining the schedule. For instance, the BS 802 may generate a communication signal A (e.g., the communication signal 350) for the UE 804*a* in a first serving beam subspace (based on a location of the UE 804*a* relative to the BS 802). The first serving beam subspace may correspond to a subspace of a serving beams 320 or 420. Similarly, the BS 802 may generate a communication signal B (e.g., the communication signal 350) for the UE 804*b* in a second serving beam subspace (based on a location of the UE 804*b* relative to the BS 802). In some examples, aspects of the action 835 may be performed by a PAPR reduction module 508 as described with reference to FIG. 5.

In some aspects, the BS 802 may determine at least one of the first serving beam subspace, the second serving beam subspace for the PAPR reduction projection, or the non-serving beam subspace based on the PAPR reduction beam subspace selection at action 830. For instance, the BS 802 may determine whether a portion of the PAPR reduction signal can be projected onto the first serving beam subspace and/or the amount that can be projected one the first serving beam subspace based on the measurement report A. Similarly, the BS 802 may determine whether a portion of the PAPR reduction signal can be projected onto the second serving beam subspace and/or the amount that can be projected one the second serving beam subspace based on the measurement report B. The BS may also determine the non-beam serving subspace based on the measurement reports A and/or B. For example, the BS may select the beam subspaces with low RSRP measurements at the UE 804*a* and/or UE 804*b* to be the non-serving beam subspace.

In an example, the first serving beam subspace may correspond to the serving beam 420*a* and the second serving beam subspace may correspond to the serving beam 420*b*. The BS 802 may generate a PAPR reduction signal (e.g., the PAPR reduction signals 460 and/or 762), project a portion of the PAPR reduction signal to at least one of the first serving beam subspace and the second serving beam subspace, and project another portion of the PAPR reduction signal onto a non-serving beam subspace orthogonal to the first serving beam subspace and the second serving beam subspace.

In some aspects, the BS 802 may project a first portion of the PAPR reduction signal onto the first spatial subspace based on a performance metric (e.g., a EVM margin) of the UE 804*a* indicated in the measurement report A. Additionally or alternatively, the BS 802 may project a second portion of the PAPR reduction signal to the second spatial subspace based on a performance metric (e.g., a EVM margin) of the UE 804*b* indicated in the measurement report B. The BS 802 may determine the first portion (for projecting onto the first serving beam subspace) and the second portion (for projecting onto the second serving beam subspace) by determining interference weightings (e.g., the diagonal matrix A in equation (6)) according to the measurement reports of the UE 804*a* and 804*b*.

In some aspects, the BS 802 may determine a MCS for transmitting the communication signal A to the UE 804*a* based on an amount of interference that may be created by the projection of the first portion onto the first spatial subspace. Similarly, the BS 802 may determine a MCS for transmitting the communication signal B to the UE 804*b* based on an amount of interference that may be created by the projection of the second portion onto the second spatial subspace. In some other aspects, the BS 802 may determine a first MCS for the UE 804*a* and a second MCS for UE 804*b* and perform the PAPR reduction signal projection or determine the interference weighting by considering the first MCS and the second MCS. Accordingly, the BS 802 allows for UE dependent back-off consideration when performing PAPR reduction.

At action 840, the BS 802 may perform a MU-MIMO transmission, for example, by transmitting the communication signal A for the UE 804*a* in the first spatial subspace, the communication signal B for the UE 804*b* in the second spatial subspace, and the PAPR reduction signal concurrently. The concurrent transmissions allow for a PAPR reduced signal (satisfying a target PAPR) to be transmitted at each antenna element of the BS 802. Without the PAPR reduction, signals at an antenna element input can be distorted (e.g., due to PA non-linearity). In some examples, aspects of the action 840 may be performed by a PAPR reduction module 508 as described with reference to FIG. 5.

Figure 9:
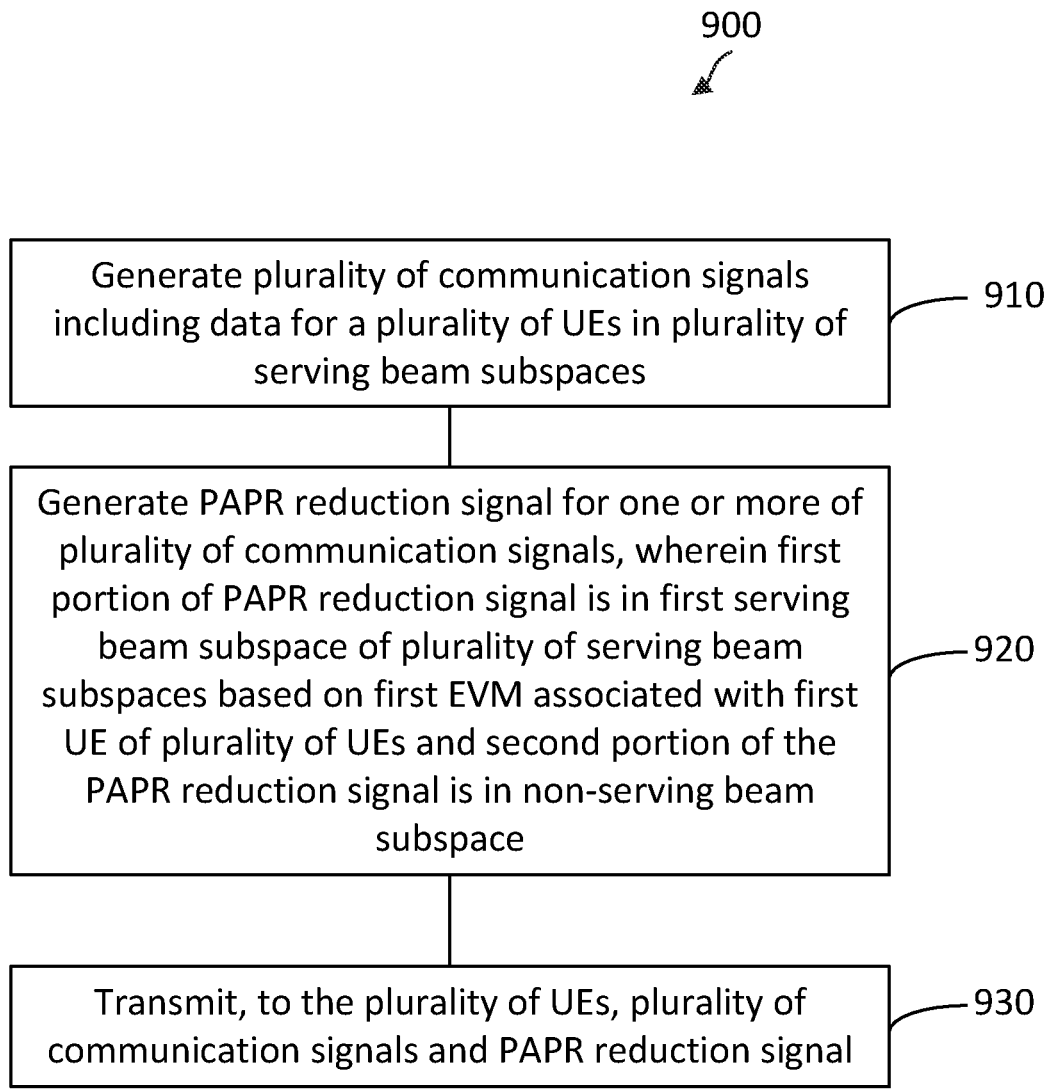
FIG. 9 is a flow diagram of a wireless communication method according to some aspects of the present disclosure.

FIG. 9 is a flow diagram of wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BS 105, 305, 405, or 500, may utilize one or more components, such as the processor 502, the memory 504, the PAPR reduction module 508, the transceiver 510, the modem 512, and the one or more antennas 516, to execute the steps of method 900. The method 900 may employ similar mechanisms as described above with respect to FIGS. 4-8. As illustrated, the method 900 includes several enumerated steps, but aspects of the method 900 may include additional steps before, after, and in between the enumerated steps. In some aspects, one or more of the enumerated steps may be omitted or performed in a different order.

At block 910, a BS (e.g., the BSs 105, 305, 405, or 500) generates a plurality of communication signals (e.g., the communication signals 350) including data for a plurality of UEs (e.g., the UEs 115, 315, 415, and/or 600) in a plurality of serving beam subspaces (e.g., the beams 320). In some instances, the BS may utilize one or more components, such as the processor 502, the memory 504, the PAPR reduction module 508, the transceiver 510, and the modem 512 to perform aspects of the block 910.

At block 920, the BS generates a PAPR reduction signal (e.g., the PAPR reduction signals 460 and/or 762) for one or more of the plurality of communication signals. A first portion of the PAPR reduction signal is in a first serving beam subspace of the plurality of serving beam subspaces based on a first EVM associated with a first UE of the plurality of UEs and a second portion of the PAPR reduction signal is in a non-serving beam subspace. The non-serving beam subspace may be orthogonal to the plurality serving beam subspaces. In some instances, the BS may utilize one or more components, such as the processor 502, the memory 504, the PAPR reduction module 508, the transceiver 510, and the modem 512 to perform aspects of the block 920.

In some aspects, the first serving beam subspace may be associated with the first UE. As part of generating the PAPR reduction signal, the BS may project the first portion of the PAPR reduction signal onto the first serving beam subspace based on the first EVM associated with the first UE. In some aspects, a second serving beam subspace of the plurality of serving beam subspaces may be associated with a second UE of the plurality of UEs. As part of generating the PAPR reduction signal, the BS may also project a third portion of the PAPR reduction signal onto the second serving beam subspace based on a second EVM associated with the second UE, where the second EVM may be different from the first EVM. In some aspects, the BS may generate the PAPR reduction further based on a target PAPR.

At block 930, the BS transmits, to the plurality of UEs, the plurality of communication signals and the PAPR reduction signal. In some instances, the BS may utilize one or more components, such as the processor 502, the memory 504, the PAPR reduction module 508, the transceiver 510, and the modem 512 to perform aspects of the block 930.

In some aspects, as part of generating the plurality of communication signals at block 910, the BS may apply a precoding based on at least the first serving beam subspace, for example, using a precoding block 710 discussed above with reference to FIG. 7. As part of generating the PAPR reduction signal at block 920, the BS may determine a first weighting based on the first EVM associated with the first UE and project the first portion of the PAPR reduction signal onto the first serving beam subspace further based on the first weighting and the precoding.

In some aspects, the BS may further clip at least a first communication signal of the plurality of communication signals based on a maximum value and a minimum value, for example, using a clipping block 740 discussed above with reference to FIG. 7. As part of generating the PAPR reduction signal at block 920, the BS may generate the PAPR reduction signal based on the first communication signal and the clipped first communication signal, for example, by subtracting the first communication signal from the clipped first communication signal using a signal difference block 760 as discussed above with reference to FIG. 7. In some aspects, the BS may further transform the clipped first communication signal to a frequency domain, for example, by using a FFT block 750 discussed above with reference to FIG. 7. As part of generating the PAPR reduction signal at block 920, the BS may further project the first portion of the PAPR reduction signal onto the first serving beam subspace in the frequency domain based on the first EVM and the second portion of the PAPR reduction signal onto the non-serving beam subspace in the frequency domain, for example, using a subspace projection block 770 discussed above with reference to FIG. 7. The BS may also further project the first portion of the PAPR reduction signal onto a second serving beam subspace of the plurality of serving beam subspaces in the frequency domain based on a second EVM associated with a second UE of the plurality of UEs, where the second UE is being served in the second serving beam subspace and the second EVM is different from the first EVM.

In some aspects, the BS may determine a set of PAPR reduction beam subspaces. The BS may also transmit a plurality of reference signals in one or more PAPR reduction beam subspaces of the set of PAPR reduction beam subspaces. In some aspects, as part of transmitting the plurality of reference signals at block 930, the BS may transmit, in a first PAPR reduction beam space of the set of PAPR reduction beam subspaces, a first reference signal of the plurality of reference signals based on a first pilot pattern associated with the first PAPR reduction beam subspace and transmit, in a second PAPR reduction beam subspace of the set of PAPR reduction beam subspaces, a second reference signal plurality of reference signals based on a second pilot pattern associated with the second PAPR reduction beam subspace, where the second pilot pattern is different from the first pilot pattern. In some aspects, the BS may further receive, from the first UE, a measurement report based on at least a first reference signal of the plurality of reference signals in the first serving beam subspace. The measurement report may include at least one of a target EVM, an allowable EVM increment, a SNR, or a RSRP. The BS may also select at least one of the first serving beam subspace or the non-serving beam subspace for generating the PAPR reduction signal based on the measurement report.

In some aspects, as part of transmitting the plurality of communication signals and the PAPR reduction signal at block 930, the BS may transmit, to the first UE, a first communication signal of the plurality of communication signals in at least the first serving beam subspace and transmit, to a second UE, a second communication signal of the plurality of communication signals in at least a second serving beam subspace of the plurality of serving beam subspaces concurrent with the first communication signal and the PAPR reduction signal. In some aspects, the BS may further determine a first MCS for transmitting the first communication signal to the first UE based on an amount of interference created by the first portion of the PAPR reduction signal in the first serving beam subspace.

Figure 10:
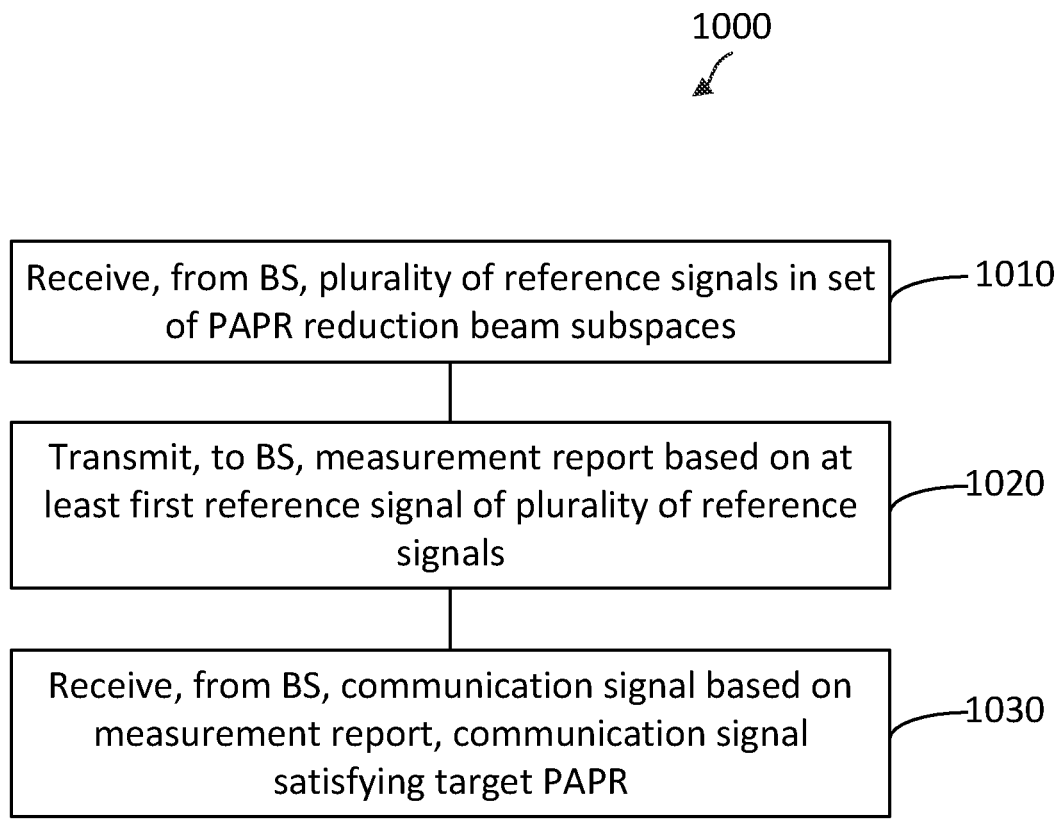
FIG. 10 is a flow diagram of a wireless communication method according to some aspects of the present disclosure.

FIG. 10 is a flow diagram of wireless communication method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UE 115, 315, 415, or 600, may utilize one or more components, such as the processor 602, the memory 604, the PAPR reduction module 608, the transceiver 610, the modem 612, and the one or more antennas 616, to execute the steps of method 1000. The method 1000 may employ similar mechanisms as described above with respect to FIGS. 4-8. As illustrated, the method 900 includes several enumerated steps, but aspects of the method 1000 may include additional steps before, after, and in between the enumerated steps. In some aspects, one or more of the enumerated steps may be omitted or performed in a different order.

At block 1010, a UE (e.g., the UEs 115, 315, 415, and/or 600) receives, from a BS (e.g., the BSs 105, 205, 405, and/or 500), a plurality of reference signals in a set of PAPR reduction beam subspaces. In some instances, the UE may utilize one or more components, such as the processor 602, the memory 604, the PAPR reduction module 608, the transceiver 610, and the modem 612 to perform aspects of the block 1010.

In some aspects, the UE may receive, from the BS in a first PAPR reduction beam space of the set of PAPR reduction beam subspaces, a first reference signal of the plurality of reference signals based on a first pilot pattern associated with the first PAPR reduction beam subspace. The UE may also receive, from the BS in a second PAPR reduction beam subspace of the set of PAPR reduction beam subspaces, a second reference signal of plurality of reference signals based on a second pilot pattern associated with the second PAPR reduction beam subspace, the second pilot pattern being different from the first pilot pattern.

At block 1020, the UE transmits, to the BS, a measurement report based on at least a first reference signal of the plurality of reference signal. In some instances, the UE may utilize one or more components, such as the processor 602, the memory 604, the PAPR reduction module 608, the transceiver 610, and the modem 612 to perform aspects of the block 1020.

In some aspects, the measurement report may include including at least one of a target EVM, an allowable EVM increment, an SNR, or a RSRP.

At block 1030, the UE receives, from the BS, a communication signal based on the measurement report, the communication signal satisfying a target PAPR. In some instances, the UE may utilize one or more components, such as the processor 602, the memory 604, the PAPR reduction module 608, the transceiver 610, and the modem 612 to perform aspects of the block 1030.

In some aspects, the UE may receive the communication signal in a first serving beam subspace non-overlapping with the set of PAPR reduction beam subspaces. In some aspects, the UE may receive the communication signal in a first serving beam subspace at least partially overlapping with the set of PAPR reduction beam subspaces.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a base station, comprising:
   generating a plurality of communication signals including data for a plurality of user equipments (UEs) in a plurality of serving beam subspaces;
   generating a peak-to-average-power ratio (PAPR) reduction signal for one or more of the plurality of communication signals, wherein a first portion of the PAPR reduction signal is in a first serving beam subspace of the plurality of serving beam subspaces based on a first error vector magnitude (EVM) associated with a first UE of the plurality of UEs and a second portion of the PAPR reduction signal is in a non-serving beam subspace; and
   transmitting, to the plurality of UEs, the plurality of communication signals and the PAPR reduction signal.

2. The method of claim 1, wherein the first serving beam subspace is associated with the first UE, and wherein the generating the PAPR reduction signal further comprises:
   projecting the first portion of the PAPR reduction signal onto the first serving beam subspace based on the first EVM associated with the first UE.

3. The method of claim 2, wherein a second serving beam subspace of the plurality of serving beam subspaces is associated with a second UE of the plurality of UEs, and wherein the generating the PAPR reduction signal further comprises:
   projecting the first portion of the PAPR reduction signal further onto the second serving beam subspace based on a second EVM associated with the second UE, the second EVM being different from the first EVM.

4. The method of claim 2, wherein:
   the generating the plurality of communication signals comprises:
      applying a precoding based on at least the first serving beam subspace; and
   the generating the PAPR reduction signal further comprises:
      determining a first weighting based on the first EVM associated with the first UE; and
      projecting the first portion of the PAPR reduction signal onto the first serving beam subspace further based on the first weighting and the precoding.

5. The method of claim 1, further comprising:
   clipping at least a first communication signal of the plurality of communication signals based on a maximum value and a minimum value,
   wherein the generating the PAPR reduction signal further comprises:
      generating the PAPR reduction signal based on the first communication signal and the clipped first communication signal.

6. The method of claim 5, further comprising:
   transforming the clipped first communication signal to a frequency domain, wherein the generating the PAPR reduction signal further comprises:
projecting the first portion of the PAPR reduction signal onto at least the first serving beam subspace in the frequency domain based on the first EVM associated with the first UE and the second portion of the PAPR reduction signal onto the non-serving beam subspace in the frequency domain.

7. The method of claim 6, wherein a second serving beam subspace of the plurality of serving beam subspaces is associated with a second UE of the plurality of UEs, and wherein the generating the PAPR reduction signal further comprises:
projecting the first portion of the PAPR reduction signal further onto the second serving beam subspace in the frequency domain based on a second EVM associated with the second UE, the second EVM being different from the first EVM.

8. The method of claim 1, wherein the generating the PAPR reduction signal further comprises:
generating the PAPR reduction signal further based on a target PAPR.

9. The method of claim 1, further comprising:
determining a set of PAPR reduction beam subspaces; and
transmitting a plurality of reference signals in one or more PAPR reduction beam subspaces of the set of PAPR reduction beam subspaces.

10. The method of claim 9, wherein the transmitting the plurality of reference signals comprises:
transmitting, in a first PAPR reduction beam subspace of the set of PAPR reduction beam subspaces, a first reference signal of the plurality of reference signals based on a first pilot pattern associated with the first PAPR reduction beam subspace; and
transmitting, in a second PAPR reduction beam subspace of the set of PAPR reduction beam subspaces, a second reference signal plurality of reference signals based on a second pilot pattern associated with the second PAPR reduction beam subspace, the second pilot pattern being different from the first pilot pattern.

11. The method of claim 9, further comprising
receiving, from the first UE, a measurement report based on at least a first reference signal of the plurality of reference signals in the first serving beam subspace; and
selecting at least one of the first serving beam subspace or the non-serving beam subspace for generating the PAPR reduction signal based on the measurement report.

12. The method of claim 11, wherein the receiving the measurement report comprises:
receiving the measurement report including at least one of a target error vector magnitude (EVM), an allowable EVM increment, a signal-to-noise ratio (SNR), or a reference signal received power (RSRP).

13. The method of claim 1, wherein the transmitting the plurality of communication signals and the PAPR reduction signal comprises:
transmitting, to the first UE, a first communication signal of the plurality of communication signals in at least the first serving beam subspace; and
transmitting, to a second UE, a second communication signal of the plurality of communication signals in at least a second serving beam subspace of the plurality of serving beam subspaces concurrent with the first communication signal and the PAPR reduction signal.

14. The method of claim 13, further comprising:
determining a first modulation coding scheme (MCS) for transmitting the first communication signal to the first UE based on an amount of interference created by the first portion of the PAPR reduction signal in the first serving beam subspace.

15. A method of wireless communication performed by a user equipment, comprising:
receiving, from a base station (BS), a plurality of reference signals in a set of peak-to-average-power ratio (PAPR) reduction beam subspaces;
transmitting, to the BS, a measurement report based on at least a first reference signal of the plurality of reference signals; and
receiving, from the BS, a communication signal based on the measurement report, the communication signal satisfying a target PAPR.

16. The method of claim 15, wherein the receiving the one or more reference signals comprises:
receiving, from the BS in a first PAPR reduction beam subspace of the set of PAPR reduction beam subspaces, a first reference signal of the plurality of reference signals based on a first pilot pattern associated with the first PAPR reduction beam subspace; and
receiving, from the BS in a second PAPR reduction beam subspace of the set of PAPR reduction beam subspaces, a second reference signal of plurality of reference signals based on a second pilot pattern associated with the second PAPR reduction beam subspace, the second pilot pattern being different from the first pilot pattern.

17. The method of claim 15, wherein the transmitting the measurement report comprises:
transmitting, to the BS, the measurement report including at least one of a target error vector magnitude (EVM), an allowable EVM increment, a signal-to-noise ratio (SNR), or a reference signal received power (RSRP).

18. The method of claim 15, wherein the receiving the communication signal comprises:
receiving the communication signal in a first serving beam subspace non-overlapping with the set of PAPR reduction beam subspaces.

19. The method of claim 15, wherein the receiving the communication signal comprises:
receiving the communication signal in a first serving beam subspace at least partially overlapping with the set of PAPR reduction beam subspaces.

20. A base station (BS) comprising:
a processor configured to:
generate a plurality of communication signals including data for a plurality of user equipments (UEs) in a plurality of serving beam subspaces; and
generate a peak-to-average-power ratio (PAPR) reduction signal for one or more of the plurality of communication signals, wherein a first portion of the PAPR reduction signal is in a first serving beam subspace of the plurality of serving beam subspaces based on a first error vector magnitude (EVM) associated with a first UE of the plurality of UEs and a second portion of the PAPR reduction signal is in a non-serving beam subspace; and
a transceiver configured to:
transmit, to the plurality of UEs, the plurality of communication signals and the PAPR reduction signal.

21. The BS of claim 20, wherein the first serving beam subspace is associated with the first UE, and wherein the processor configured to generate the PAPR reduction signal is further configured to:

project the first portion of the PAPR reduction signal onto the first serving beam subspace based on the first EVM associated with the first UE.

22. The BS of claim 21, wherein a second serving beam subspace of the plurality of serving beam subspaces is associated with a second UE of the plurality of UEs, and wherein the processor configured to generate the PAPR reduction signal is further configured to:
project the first portion of the PAPR reduction signal further onto the second serving beam subspace based on a second EVM associated with the second UE, the second EVM being different from the first EVM.

23. The BS of claim 20, wherein the processor configured to generate the PAPR reduction signal is further configured to:
generate the PAPR reduction signal further based on a target PAPR.

24. The BS of claim 20, wherein:
the processor is further configured to:
determine a set of PAPR reduction beam subspaces; and
the transceiver is further configured to:
transmit a plurality of reference signals in one or more PAPR reduction beam subspaces of the set of PAPR reduction beam subspaces.

25. The BS of claim 24, wherein the transceiver configured to transmit the plurality of reference signals is further configured to:
transmit, in a first PAPR reduction beam subspace of the set of PAPR reduction beam subspaces, a first reference signal of the plurality of reference signals based on a first pilot pattern associated with the first PAPR reduction beam subspace; and
transmit, in a second PAPR reduction beam subspace of the set of PAPR reduction beam subspaces, a second reference signal plurality of reference signals based on a second pilot pattern associated with the second PAPR reduction beam subspace, the second pilot pattern being different from the first pilot pattern.

26. The BS of claim 24, wherein:
the transceiver is further configured to:
receive, from the first UE, a measurement report based on at least a first reference signal of the plurality of reference signals in the first serving beam subspace; and the processor is further configured to:
select at least one of the first serving beam subspace or the non-serving beam subspace for generating the PAPR reduction signal based on the measurement report.

27. A user equipment (UE) comprising:
a transceiver configured to:
receive, from a base station (BS), a plurality of reference signals in a set of peak-to-average-power ratio (PAPR) reduction beam subspaces;
transmit, to the BS, a measurement report based on at least a first reference signal of the plurality of reference signals; and
receive, from the BS, a communication signal based on the measurement report, the communication signal satisfying a target PAPR.

28. The UE of claim 27, wherein the transceiver configured to receive the one or more reference signals is further configured to:
receive, from the BS in a first PAPR reduction beam subspace of the set of PAPR reduction beam subspaces, a first reference signal of the plurality of reference signals based on a first pilot pattern associated with the first PAPR reduction beam subspace; and
receive, from the BS in a second PAPR reduction beam subspace of the set of PAPR reduction beam subspaces, a second reference signal of plurality of reference signals based on a second pilot pattern associated with the second PAPR reduction beam subspace, the second pilot pattern being different from the first pilot pattern.

29. The UE of claim 27, wherein the transceiver configured to receive the communication signal is further configured to:
receive the communication signal in a first serving beam subspace non-overlapping with the set of PAPR reduction beam subspaces.

30. The UE of claim 27, wherein the transceiver configured to receive the communication signal is further configured to:
receive the communication signal in a first serving beam subspace at least partially overlapping with the set of PAPR reduction beam subspaces.

* * * * *